United States Patent
Lim et al.

(10) Patent No.: US 11,871,031 B2
(45) Date of Patent: Jan. 9, 2024

(54) METHOD FOR INDUCING PREDICTION MOTION VECTOR AND APPARATUSES USING SAME

(71) Applicants: Electronics and Telecommunications Research Institute, Daejeon (KR); Industry-University Cooperation Foundation Korea Aerospace University, Goyang-si (KR)

(72) Inventors: Sung Chang Lim, Daejeon-si (KR); Hui Yong Kim, Daejeon-si (KR); Jin Ho Lee, Daejeon-si (KR); Jin Soo Choi, Daejeon-si (KR); Jin Woong Kim, Daejeon-si (KR); Jae Gon Kim, Goyang-si (KR); Sang Yong Lee, Goyang-si (KR); Un Ki Park, Goyang-si (KR)

(73) Assignees: Electronics and Telecommunications Research Institute, Daejeon (KR); Industry-University Cooperation Foundation Korea Aerospace University, Goyang-si (KR)

( * ) Notice: Subject to any disclaimer, the term of this patent is extended or adjusted under 35 U.S.C. 154(b) by 0 days.

(21) Appl. No.: 16/927,003

(22) Filed: Jul. 13, 2020

(65) Prior Publication Data
US 2020/0344490 A1 Oct. 29, 2020

Related U.S. Application Data

(63) Continuation of application No. 16/214,725, filed on Dec. 10, 2018, now Pat. No. 10,750,202, which is a
(Continued)

(30) Foreign Application Priority Data

Sep. 16, 2011 (KR) .......................... 10-2011-0093564
Oct. 17, 2011 (KR) .......................... 10-2011-0106108
(Continued)

(51) Int. Cl.
*H04N 19/56* (2014.01)
*H04N 19/70* (2014.01)
(Continued)

(52) U.S. Cl.
CPC ............. *H04N 19/56* (2014.11); *H04N 19/13* (2014.11); *H04N 19/513* (2014.11);
(Continued)

(58) Field of Classification Search
CPC ....... H04N 19/105; H04N 19/13; H04N 19/56
See application file for complete search history.

(56) References Cited

U.S. PATENT DOCUMENTS 5,748,231 A * 5/1998 Park ................... H04N 5/23267
348/207.99
9,451,281 B2 9/2016 Lim et al.
(Continued)

FOREIGN PATENT DOCUMENTS

CN 103988509 B 3/2018
JP 2004-96705 A 3/2004
(Continued)

OTHER PUBLICATIONS

Li, B., et al., "On merge candidate construction" 5th Meeting on Joint Collaborative Team on Video Coding (JCT-VC) of ITU-T SG16 WP3 and ISO/IEC JTC1/SC29/WG11, JCTVC-E146, held in Geneva, Switzerland on Mar. 16-23, 2011 (5 pages in English).
(Continued)

*Primary Examiner* — Zhubing Ren
(74) *Attorney, Agent, or Firm* — NSIP Law

(57) ABSTRACT

Disclosed are a method for inducing a prediction motion vector and an apparatus using the same. An image decoding method can include: a step of determining the information related to a plurality of spatial candidate prediction motion vectors from peripheral predicted blocks of a predicted target block; and a step of determining the information related to temporal candidate prediction motion vectors on
(Continued)

the basis of the information related to the plurality of spatial candidate prediction motion vectors. Accordingly, the present invention can reduce complexity and can enhance coding efficiency when inducing the optimum prediction motion vector.

20 Claims, 20 Drawing Sheets

Related U.S. Application Data continuation of application No. 15/244,527, filed on Aug. 23, 2016, now Pat. No. 10,194,167, which is a continuation of application No. 14/344,105, filed as application No. PCT/KR2012/007388 on Sep. 14, 2012, now Pat. No. 9,451,281.

(30) Foreign Application Priority Data

Jan. 18, 2012 (KR) .................. 10-2012-0005916
Sep. 14, 2012 (KR) .................. 10-2012-0102214

(51) Int. Cl.
| H04N 19/52 | (2014.01) |
| H04N 19/13 | (2014.01) |
| H04N 19/593 | (2014.01) |
| H04N 19/513 | (2014.01) |
| H04N 19/105 | (2014.01) |
| H04N 19/139 | (2014.01) |
| H04N 19/176 | (2014.01) |

(52) U.S. Cl.
CPC ........... H04N 19/52 (2014.11); H04N 19/593 (2014.11); H04N 19/70 (2014.11); *H04N 19/105* (2014.11); *H04N 19/139* (2014.11); *H04N 19/176* (2014.11)

(56) References Cited

U.S. PATENT DOCUMENTS

| 10,362,328 | B2 | 7/2019 | Kondo et al. | |
|---|---|---|---|---|
| 10,887,585 | B2 | 1/2021 | Sugio et al. | |
| 2005/0141612 | A1* | 6/2005 | Abe | H04N 19/109 |
| | | | | 375/240.16 |
| 2009/0304084 | A1* | 12/2009 | Hallapuro | H04N 19/513 |
| | | | | 375/E7.123 |
| 2010/0220790 | A1 | 9/2010 | Jeon et al. | |
| 2010/0284469 | A1* | 11/2010 | Sato | H04N 19/12 |
| | | | | 375/240.16 |
| 2010/0290527 | A1* | 11/2010 | Park | H04N 19/70 |
| | | | | 375/240.13 |
| 2011/0013697 | A1* | 1/2011 | Choi | H04N 19/176 |
| | | | | 375/240.16 |
| 2011/0188579 | A1* | 8/2011 | Lin | H04N 19/56 |
| | | | | 375/240.16 |
| 2012/0128060 | A1* | 5/2012 | Lin | H04N 19/573 |
| | | | | 375/240.02 |
| 2012/0269271 | A1* | 10/2012 | Chen | H04N 19/513 |
| | | | | 375/E7.243 |
| 2012/0307903 | A1* | 12/2012 | Sugio | H04N 19/107 |
| | | | | 375/240.16 |
| 2013/0022127 | A1 | 1/2013 | Park et al. | |
| 2013/0272404 | A1* | 10/2013 | Park | H04N 19/517 |
| | | | | 375/240.15 |
| 2014/0140408 | A1 | 5/2014 | Lee et al. | |
| 2020/0344490 | A1 | 10/2020 | Lim et al. | |

FOREIGN PATENT DOCUMENTS

| JP | 2008-544676 | A | 12/2008 |
|---|---|---|---|
| JP | 6046142 | B2 | 12/2016 |
| KR | 10-2003-0070278 | A | 8/2003 |
| KR | 10-2008-0041630 | A | 5/2008 |
| WO | WO 2006/136983 | A3 | 12/2006 |
| WO | WO 2010/078212 | A1 | 7/2010 |
| WO | WO 2012/128540 | A2 | 9/2012 |
| WO | WO 2012/173415 | A2 | 12/2012 |
| WO | WO 2013/001818 | A1 | 1/2013 |

OTHER PUBLICATIONS

Chen, J. et al., "MVP index parsing with fixed number of candidates" 6th Meeting on Joint Collaborative Team on Video Coding (JCT-VC) of ITU-T SG16 WP3 and ISO/IEC JTC1/SC29/WG11, Document: JCTVC-F402, held in Torino, Italy, on Jul. 14-22, 2011 (17 pages in English).

Nakamura, H. et al., "Unification of derivation process for merge mode and MVP" 6th Meeting on Joint Collaborative Team on Video Coding (JCT-VC) of ITU-T SG16 WP3 and ISO/IEC JTC1/SC29/WG11, Document: JCTVC-F419, held in Torino, Italy, on Jul. 14-22, 2011 (10 pages in English).

Sugio, T. et al., "Parsing Robustness for Merge/AMVP" 6th Meeting on Joint Collaborative Team on Video Coding (JCT-VC) of ITU-T SG16 WP3 and ISO/IEC JTC1/SC29/WG11, Document: JCTVC-F470, held in Torino, Italy, on Jul. 14-22, 2011 (21 pages in English).

Zheng Y. et al., "CE9: Unified Merge and AMVP candidates selection (UNI03)" 6th Meeting on Joint Collaborative Team on Video Coding (JCT-VC) of ITU-T SG16 WP3 and ISO/IEC JTC1/SC29/WG11, Document: JCTVc_F297, held in Torino, Italy, on Jul. 14-22, 2011 (11 pages in English).

International Search Report dated Feb. 15, 2013 in corresponding International Patent Application No. PCT/KR2012/007388 (5 pages with English Translation).

Korean Office Action dated Oct. 25, 2013 in corresponding Korean Patent Application No. 10-2012-0102214 (3 pages in Korean).

Bross, Benjamin et al., "WD4: Working draft 4 of high-efficiency video coding." Joint Collaborative Team on Video Coding (JCT-VC) ITU-T SG16 WP3 and ISO/IEC JTC1/SC29/WG11 6th Meeting, Torino, IT, Jul. 2011. (11 pages in English and 1 page in Japanese).

Laroche, Guillaume, et al. "Robust solution for the AMVP parsing issue" Joint Collaborative Team on Video Coding (JCT-VC) of ITU-T SG16 WP3 and ISO/IEC JTC1/SC29/WG11, JCTVC-E219, 5th meeting: Geneva, CH, Mar. 2011, (11 pages in English).

* cited by examiner

METHOD FOR INDUCING PREDICTION MOTION VECTOR AND APPARATUSES USING SAME

CROSS-REFERENCE TO RELATED APPLICATIONS

This application is a Continuation of U.S. patent application Ser. No. 16/214,725 filed on Dec. 10, 2018, which is a Continuation of U.S. patent application Ser. No. 15/244,527 filed on Aug. 23, 2016, now U.S. Pat. No. 10,194,167 issued on Jan. 29, 2019, which is a Continuation of U.S. patent application Ser. No. 14/344,105 filed on Mar. 13, 2014, now U.S. Pat. No. 9,451,281 issued on Sep. 20, 2016, which is a National Stage application of International Application No. PCT/KR2012/007388, filed Sep. 14, 2012 and published as WO 2013/039356 A2, on Mar. 21, 2013, which claims benefit under 35 U.S.C. § 119(a) of Korean Patent Application Nos. 10-2011-0093564, filed on Sep. 16, 2011, 10-2011-0106108, filed on Oct. 17, 2011, 10-2012-0005916, filed on Jan. 18, 2012, and 10-2012-0102214, filed on Sep. 14, 2012, in the Korean Intellectual Property Office, the contents of all of which are incorporated herein by reference in their entireties.

TECHNICAL FIELD

The present invention is directed to a decoding method and apparatus, and more specifically to a method of inducing prediction motion vector and an apparatus using the same.

BACKGROUND ART

Demand of high-resolution, high-quality videos, such as HD (High Definition) videos or UHD (Ultra High Definition) videos, is on the rise in various application industries. As video data has higher resolution and higher quality, the amount of data relatively increases compared to existing video data. Accordingly, when the existing wired/wireless wideband circuit lines are used to transmit such video data or existing storage media are used to store the video data, transmission and storage costs increase. To address such problems that occur as the video data has higher resolution and higher quality, high-efficiency video compression technologies may be utilized.

There are various types of video compression technologies. Among others, inter-prediction predicts pixel values included in a current picture from the previous or subsequent picture of the current picture, intra-prediction predicts pixel values included in the current picture using pixel information in the current picture, and entropy encoding assigns a shorter code to a more frequent value while assigning a longer code to a less frequent value. Such video compression technologies may be used to effectively compress, transmit, or store video data.

DISCLOSURE

Technical Problem

An object of the present invention is to provide a method of configuring a candidate prediction motion vector list for increasing video encoding/decoding efficiency.

Another object of the present invention is to provide an apparatus that performs a method of configuring a candidate prediction motion vector list for increasing video encoding/decoding efficiency.

Technical Solution

To achieve the above objects, according to an aspect of the present invention, a method of configuring a candidate prediction motion vector list may include the steps of determining information regarding a plurality of spatial candidate prediction motion vectors from an adjacent prediction block of a prediction target block and determining information regarding a temporal candidate prediction motion vector based on the information regarding the plurality of spatial candidate prediction motion vectors.

The information regarding the plurality of spatial candidate prediction motion vectors may include at least one of spatial candidate prediction motion vector availability information indicating whether a spatial candidate prediction motion vector is induced and the spatial candidate prediction motion vector, and the information regarding the temporal candidate prediction motion vector may include at least one of temporal candidate prediction motion vector availability information indicating whether a temporal candidate prediction motion vector is induced and the temporal candidate prediction motion vector.

The step of determining the information regarding the plurality of spatial candidate prediction motion vectors from the adjacent prediction block of the prediction target block may include the steps of determining first spatial candidate prediction motion vector availability information and a first spatial candidate prediction motion vector and determining second spatial candidate prediction motion vector availability information and a second spatial candidate prediction motion vector.

The step of determining the information regarding the temporal candidate prediction motion vector based on the plurality of spatial candidate prediction motion vectors and the availability information of the plurality of spatial candidate prediction motion vectors may include the steps of, based on the first spatial candidate prediction motion vector availability information, the second spatial candidate prediction motion vector availability information, the first spatial candidate prediction motion vector, and the second spatial candidate prediction motion vector, determining whether the first spatial candidate prediction motion vector and the second spatial candidate prediction motion vector are both available and whether the first spatial candidate prediction motion vector and the second spatial candidate prediction motion vector are the same as each other or not and, in a case where the first spatial candidate prediction motion vector and the second spatial candidate prediction motion vector are both available and the first spatial candidate prediction motion vector and the second spatial candidate prediction motion vector are not the same as each other, determining the temporal candidate prediction motion vector availability information so that the temporal candidate prediction motion vector is not available, wherein the information regarding the temporal candidate prediction motion vector includes at least one of the temporal candidate prediction motion vector availability information and the temporal candidate prediction motion vector.

The step of determining the information regarding the temporal candidate prediction motion vector based on the plurality of spatial candidate prediction motion vectors and the availability information of the plurality of spatial candidate prediction motion vectors may include the steps of, based on the first spatial candidate prediction motion vector availability information, the second spatial candidate prediction motion vector availability information, the first spatial candidate prediction motion vector, and the second spatial candidate prediction motion vector, determining whether the first spatial candidate prediction motion vector and the second spatial candidate prediction motion vector are both available and whether the first spatial candidate prediction motion vector and the second spatial candidate prediction motion vector are the same as each other or not, and, in a case where at least one of the first spatial candidate prediction motion vector and the second spatial candidate prediction motion vector is not available or in a case where the first spatial candidate prediction motion vector and the second spatial candidate prediction motion vector are both available and the first spatial candidate prediction motion vector and the second spatial candidate prediction motion vector are the same as each other, performing a process of inducing the information regarding the temporal candidate prediction motion vector to determine the information regarding the temporal candidate prediction motion vector, wherein the information regarding the temporal candidate prediction motion vector includes at least one of the temporal candidate prediction motion vector availability information and the temporal candidate prediction motion vector.

The candidate prediction motion vector list may include the first spatial candidate prediction motion vector in a case where the first spatial candidate prediction motion vector is available based on the first spatial candidate prediction motion vector availability information, the second spatial candidate prediction motion vector in a case where the second spatial candidate prediction motion vector is available based on the second spatial candidate prediction motion vector availability information, and the temporal candidate prediction motion vector in a case where the temporal candidate prediction motion vector is available based on the temporal candidate prediction motion vector availability information, wherein the information regarding the temporal candidate prediction motion vector includes at least one of the temporal candidate prediction motion vector availability information and the temporal candidate prediction motion vector.

The method may further include the step of removing the second spatial candidate prediction motion vector from the candidate prediction motion vector list in a case where the first spatial candidate prediction motion vector and the second spatial candidate prediction motion vector included in the candidate prediction motion vector list are the same as each other.

The method may further include the steps of determining whether the number of candidate prediction motion vectors included in the candidate prediction motion vector list is smaller than the maximum number of the candidate prediction motion vectors that may be included in the candidate prediction motion vector list and adding or removing a candidate prediction motion vector to/from the candidate prediction motion vector list based on a result of the determination.

The step of adding or removing the candidate prediction motion vector to/from the candidate prediction motion vector list based on the result of the determination may include the steps of, in a case where the number of the candidate prediction motion vectors included in the candidate prediction motion vector list is smaller than the maximum number of the candidate prediction motion vectors, adding a zero vector to the candidate prediction motion vector list and, in a case where the number of the candidate prediction motion vectors included in the candidate prediction motion vector list is equal to or larger than the maximum number of the candidate prediction motion vectors, removing some of the candidate prediction motion vectors from the candidate prediction motion vector list so that as many candidate prediction motion vectors as the maximum number of the candidate prediction motion vectors are included in the candidate prediction motion vector list.

The first spatial candidate prediction motion vector availability information may be produced by the steps of determining whether a first motion vector is available in a first block or a second block included in a first spatial candidate prediction block group, in a case where the first motion vector is not available in the first block or the second block included in the first spatial candidate prediction block group, determining whether a second motion vector is available in the first block and the second block of the first spatial candidate prediction block group, in a case where the first motion vector or the second motion vector is not available in the first block or the second block included in the first spatial candidate prediction block group, determining whether a third motion vector is available in the first block and the second block of the first spatial candidate prediction block group, and in a case where the first motion vector, the second motion vector, or the third motion vector is not available in the first block or the second block included in the first spatial candidate prediction block group, determining whether a fourth motion vector is available in the first block and the second block of the first spatial candidate prediction block group.

The second spatial candidate prediction motion vector availability information may be produced by the steps of determining whether a first motion vector is available in a third block, a fourth block, or a fifth block included in a second spatial candidate prediction block group, in a case where the first motion vector is not available in the third block, the fourth block, or the fifth block included in the second spatial candidate prediction block group, determining whether a second motion vector is available in the third block, the fourth block, or the fifth block of the second spatial candidate prediction block group, in a case where the first motion vector or the second motion vector is not available in the third block, the fourth block, or the fifth block included in the second spatial candidate prediction block group, determining whether a third motion vector is available in the third block, the fourth block, or the fifth block of the second spatial candidate prediction block group, and in a case where the first motion vector, the second motion vector, or the third motion vector is not available in the third block, the fourth block, or the fifth block included in the second spatial candidate prediction block group, determining whether a fourth motion vector is available in the third block, the fourth block, or the fifth block of the second spatial candidate prediction block group.

To achieve the above objects, according to another aspect of the present invention, an video decoding apparatus may include an entropy decoding unit that decodes information regarding a prediction motion vector used for performing inter prediction for a prediction target block among candidate prediction motion vectors included in a candidate prediction motion vector list and a prediction unit that determines information regarding a plurality of spatial candidate prediction motion vectors from an adjacent prediction block of a prediction target block and determines information regarding a temporal candidate prediction motion vector based on the information regarding the plurality of spatial candidate prediction motion vectors to generate the candidate prediction motion vector list.

The information regarding the plurality of spatial candidate prediction motion vectors may include at least one of spatial candidate prediction motion vector availability information and the spatial candidate prediction motion vector, and the information regarding the temporal candidate prediction motion vector may include at least one of temporal candidate prediction motion vector availability information and the temporal candidate prediction motion vector.

The information regarding the plurality of spatial candidate prediction motion vectors may be at least one of first spatial candidate prediction motion vector availability information and a first spatial candidate prediction motion vector and at least one of second spatial candidate prediction motion vector availability information and a second spatial candidate prediction motion vector.

The information regarding the temporal candidate prediction motion vector may include at least one of temporal candidate prediction motion vector availability information and a temporal candidate prediction motion vector, and in a case where the first spatial candidate prediction motion vector and the second spatial candidate prediction motion vector are both available and the first spatial candidate prediction motion vector and the second spatial candidate prediction motion vector are not the same as each other, the temporal candidate prediction motion vector availability information may be determined so that the temporal candidate prediction motion vector is not available.

In a case where at least one of the first spatial candidate prediction motion vector and the second spatial candidate prediction motion vector is not available or in a case where the first spatial candidate prediction motion vector and the second spatial candidate prediction motion vector are both available and the first spatial candidate prediction motion vector and the second spatial candidate prediction motion vector are the same as each other, the information regarding the temporal candidate prediction motion vector may be determined by performing a process of inducing the information regarding the temporal candidate prediction motion vector, wherein the information regarding the temporal candidate prediction motion vector may include at least one of the temporal candidate prediction motion vector availability information and the temporal candidate prediction motion vector.

The candidate prediction motion vector list may include the first spatial candidate prediction motion vector in a case where the first spatial candidate prediction motion vector is available based on the first spatial candidate prediction motion vector availability information, the second spatial candidate prediction motion vector in a case where the second spatial candidate prediction motion vector is available based on the second spatial candidate prediction motion vector availability information, and the temporal candidate prediction motion vector in a case where the temporal candidate prediction motion vector is available based on the temporal candidate prediction motion vector availability information, wherein the information regarding the temporal candidate prediction motion vector may include at least one of the temporal candidate prediction motion vector availability information and the temporal candidate prediction motion vector.

The candidate prediction motion vector list may be reconfigured by removing the second candidate prediction motion vector in a case where the first spatial candidate prediction motion vector is the same as the second spatial candidate prediction motion vector.

The candidate prediction motion vector list may be reconfigured by determining whether the number of candidate prediction motion vectors included in the candidate prediction motion vector list is smaller than the maximum number of the candidate prediction motion vectors that may be included in the candidate prediction motion vector list and adding or removing a candidate prediction motion vector to/from the candidate prediction motion vector list based on a result of the determination.

The candidate prediction motion vector list may be reconfigured by, in a case where the number of the candidate prediction motion vectors included in the candidate prediction motion vector list is smaller than the maximum number of the candidate prediction motion vectors, adding a zero vector to the candidate prediction motion vector list, and, in a case where the number of the candidate prediction motion vectors included in the candidate prediction motion vector list is equal to or larger than the maximum number of the candidate prediction motion vectors, removing some of the candidate prediction motion vectors from the candidate prediction motion vector list so that as many candidate prediction motion vectors as the maximum number of the candidate prediction motion vectors are included in the candidate prediction motion vector list.

Advantageous Effects

As described above, the method of configuring a motion vector list and an apparatus using the method according to an embodiment of the present invention are directed to a method of configuring a candidate prediction motion vector list and calculating a prediction motion vector, and the method and apparatus may reduce complexity that occurs upon inducing the optimal prediction motion vector and may raise encoding efficiency.

BEST MODE

Hereinafter, embodiments of the present invention will be described in detail with reference to the accompanying drawings. In describing the embodiments, when determined to make the gist of the invention unclear, the detailed description on the well-known configurations or functions will be omitted.

When a component is "connected to" or "coupled to" another component, the component may be directly connected or coupled to the other component, or other components may also intervene. Further, when a specific component is "included", other components are not excluded but may be included, and such configuration is also included in the scope of the invention.

The terms "first" and "second" may be used to describe various components, but the components are not limited thereto. These terms are used only to distinguish one component from another. For example, the first component may be also named the second component, and the second component may be similarly named the first component.

The constitutional parts in the embodiments are independently shown to represent different features, but this does not mean that each constitutional part is formed of a separate hardware unit or one software constitutional unit. That is, each constitutional part is separated from the others for ease of description. At least two of the constitutional parts may be combined into a single constitutional part, or one constitutional part may be divided into a plurality of constitutional parts which may perform functions, respectively. The embodiments covering the combinations of the constitutional parts or the separation thereof may be included in the scope of the invention without departing from the gist of the invention.

Some constitutional parts are not essential ones to perform the inevitable functions of the present invention but rather may be optional constitutional parts to enhance performance. The present invention may be implemented only by the constitutional parts necessary for realizing the gist of the invention or such a configuration that includes only the essential constitutional parts excluding the optional constitutional parts used for enhancing performance may also be included in the scope of the present invention.

Figure 1:
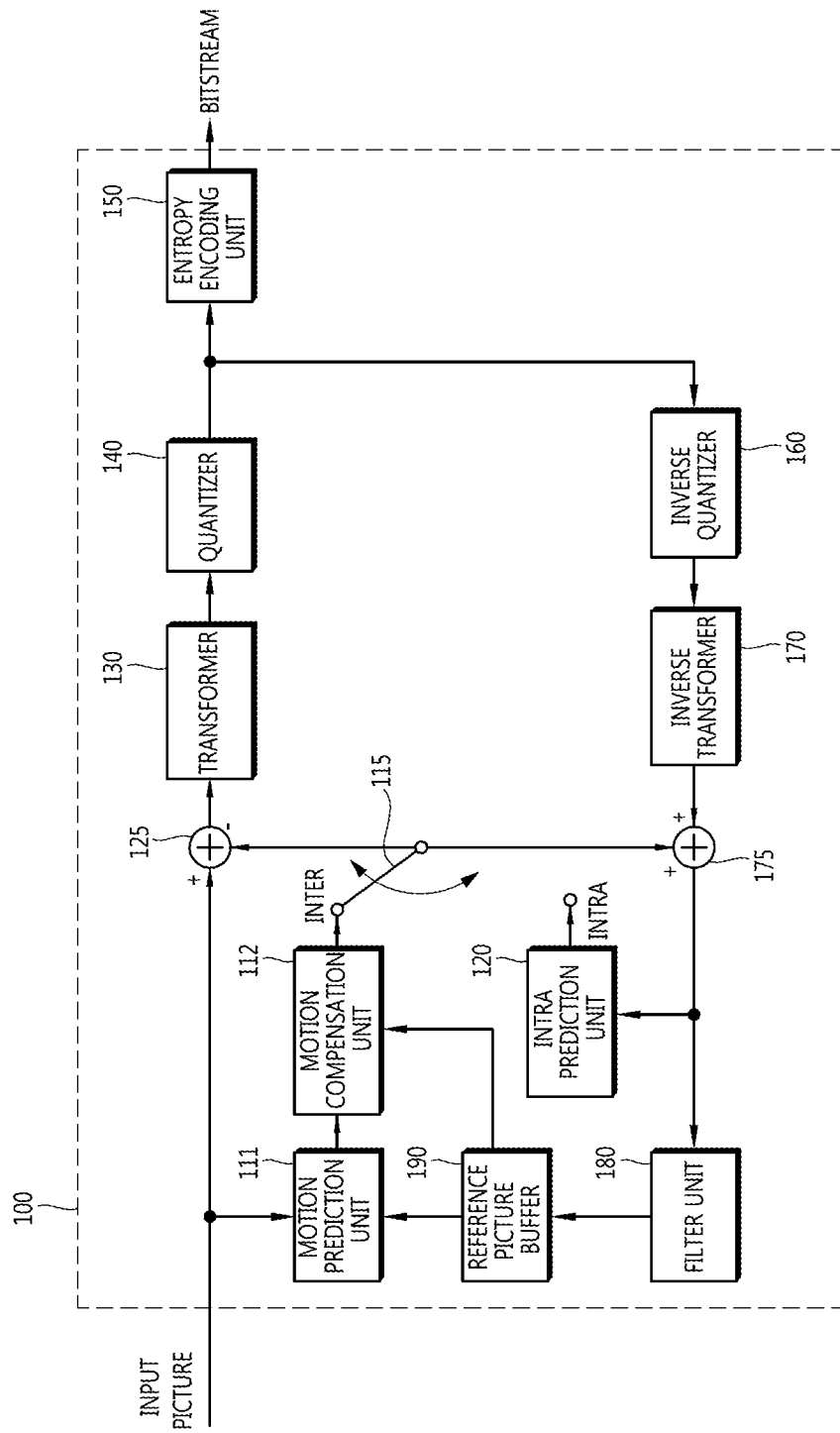
FIG. 1 is a block diagram illustrating a configuration of an video encoding apparatus according to an embodiment of the present invention.

FIG. 1 is a block diagram illustrating a configuration of an video encoding apparatus according to an embodiment of the present invention.

Referring to FIG. 1, the video encoding apparatus 100 includes a motion prediction unit 111, a motion compensation unit 112, an intra prediction unit 120, a switch 115, a subtractor 125, a transformer 130, a quantizer 140, an entropy encoding unit 150, an inverse-quantizer 160, an inverse-transformer 170, an adder 175, a filter unit 180, and a reference picture buffer 190.

The video encoding apparatus 100 performs encoding in an intra mode or in an inter mode and outputs a bit stream. In case of the intra mode, the switch 115 switches to 'intra', and in case of the inter mode, the switch 115 switches to 'inter'. The video encoding apparatus 100 produces a prediction block for an input block of an input picture and then encodes a residual of the input block and the prediction block.

In case of the intra mode, the intra prediction unit 120 may produce the prediction block by performing spatial prediction using a pixel value of an already encoded block adjacent of a current block.

In case of the inter mode, the motion prediction unit 111 may obtain a motion vector by finding a region that matches best an input block in a reference picture stored in the reference picture buffer 190 during the motion prediction process. The motion compensation unit 112 may produce the prediction block by performing motion compensation using the motion vector.

The motion prediction unit 111 may generate a candidate prediction motion vector list based on a plurality of spatial candidate prediction motion vectors induced from an adjacent prediction block of a prediction target block and information relating to a temporal candidate prediction motion vector determined based on information on the plurality of spatial candidate prediction motion vectors. A method of generating the candidate prediction motion vector list will be described below in detail, and the prediction unit that performs such operation is included in the embodiments of the present invention.

The subtractor 125 may produce a residual block by substracting of the input block and the produced prediction block. The transformer 130 performs transform on the residual block to output a transform coefficient. Here, the transform coefficient may mean a coefficient value that is obtained by performing transform on the residual block and/or residual signal. Hereinafter, as used herein, a quantized transform coefficient level that is obtained by applying quantization to the transform coefficient may also be referred to as transform coefficient.

The quantizer 140 quantizes the input transform coefficient according to a quantization parameter to output the quantized transform coefficient level.

The entropy encoding unit 150 performs entropy encoding based on the values obtained by the quantizer 140 or encoding parameters obtained during the encoding to output a bit stream.

When the entropy encoding applies, symbols are represented so that fewer bits are assigned to a symbol that has a high occurrence probability, and more bits are assigned to a symbol that has a low occurrence probability, and thus, the size of bit stream for symbols to be encoded may be reduced. Accordingly, the entropy encoding may increase compression performance of the video encoding. The entropy encoding unit 150 may use encoding schemes, such as exponential golomb, CAVLC (Context-Adaptive Variable Length Coding), or CABAC (Context-Adaptive Binary Arithmetic Coding), for entropy encoding.

The entropy encoding unit 150 may encode information on the prediction motion vector used to perform inter prediction for the prediction target block among candidate prediction motion vectors included in the candidate prediction motion vector list.

Since the video encoding apparatus shown in FIG. 1 performs inter prediction encoding, i.e., inter-frame prediction encoding, the currently encoded picture needs to be decoded and stored so that the currently encoded picture may be used as a reference picture. Accordingly, the quantized coefficient is inverse-quantized by the inverse-quantizer 160, and inverse-transformed by the inverse-transformer 170. The inverse-quantized, inverse-transformed coefficient is added to the prediction block by the adder 175, and a reconstructed block is then produced.

The reconstructed block goes through the filter unit 180 that applies at least one or more of a deblocking filter, SAO (Sample Adaptive Offset), and ALF (Adaptive Loop Filter) to the reconstructed block or reconstructed picture. After passing through the filter unit 180, the reconstructed block may be stored in the reference picture buffer 190.

Figure 2:
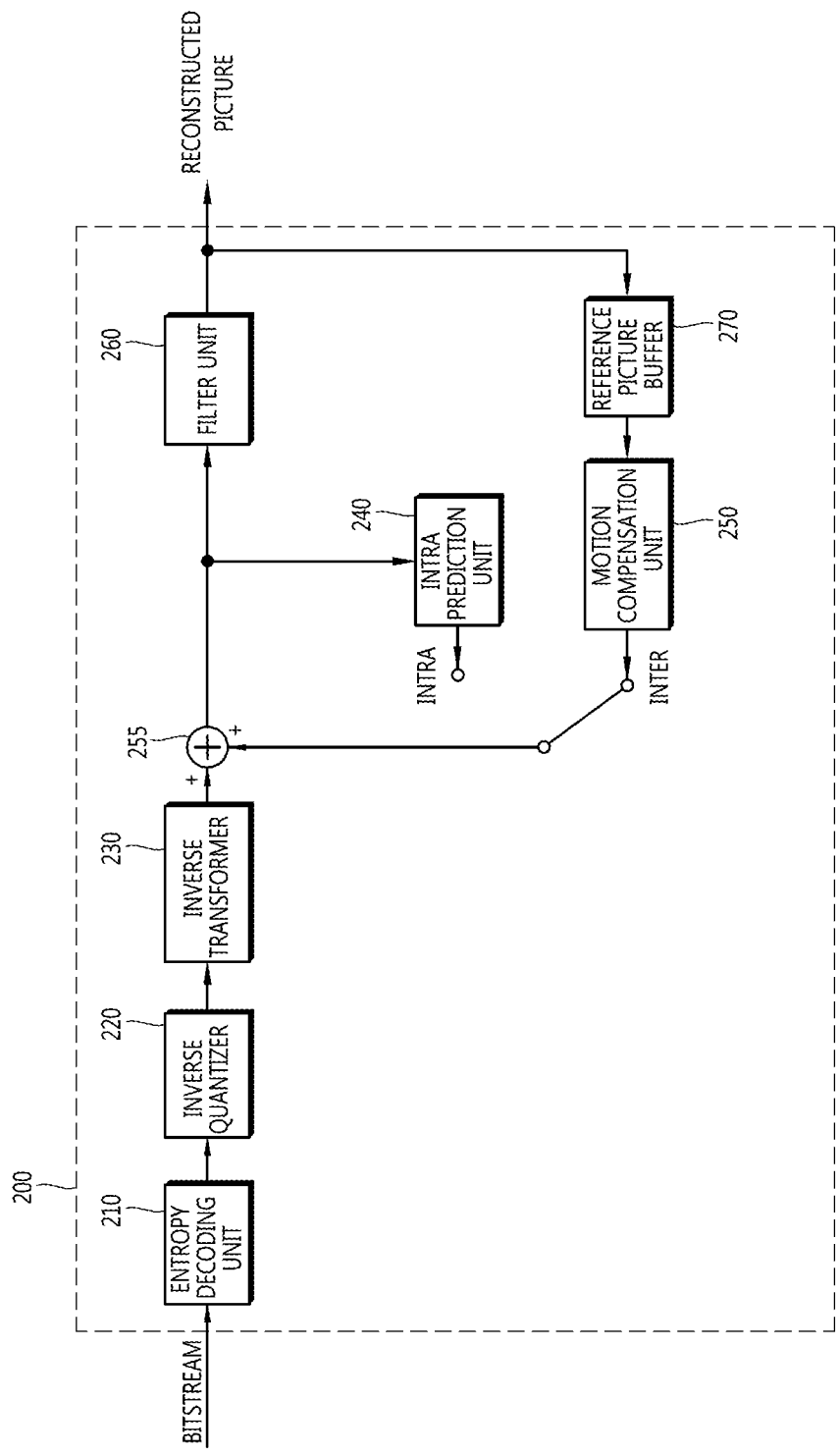
FIG. 2 is a block diagram illustrating a configuration of an video decoding apparatus according to another embodiment of the present invention.

FIG. 2 is a block diagram illustrating a configuration of an video decoding apparatus according to another embodiment of the present invention.

Referring to FIG. 2, the video decoding apparatus 200 includes an entropy decoding unit 210, an inverse-quantizer 220, an inverse-transformer 230, an intra prediction unit 240, a motion compensation unit 250, an adder 255, a filter unit 260, and a reference picture buffer 270.

The video decoding apparatus 200 receives the bit stream output from the encoder and decodes the bit stream in the intra mode or in the inter mode to thereby output a reconstructed picture, i.e., decoded picture. In case of the intra mode, the switch shifts to 'intra', and in case of the inter mode, the switch shifts to 'inter'. The video decoding apparatus 200 may obtain a reconstructed residual block from the received bit stream, may produce a prediction block, and may add the reconstructed residual block to the prediction block to thereby produce the reconstructed block, i.e., the decoded block.

The entropy decoding unit 210 entropy decodes the received bit stream according to a probability distribution to produce symbols including quantized coefficient-type symbols. The entropy decoding scheme is similar to the above-described entropy encoding scheme.

When the entropy decoding scheme applies, symbols are represented so that fewer bits are assigned to the symbols having a higher probability of occurrence, and more bits are assigned to symbols having a lower probability of occurrence, and thus, the size of the bit stream for each symbol may be reduced. Accordingly, the video decoding compression performance may be increased by the entropy decoding scheme.

The entropy decoding unit 210 may decode information on the prediction motion vector used for performing inter-frame prediction on a prediction target block among candidate prediction motion vectors included in the candidate prediction motion vector list.

The quantized coefficient may be inverse-quantized by the inverse-quantizer 220, inverse-transformed by the inverse-transformer 230, and as a result of inverse-quantization/inverse-transform, a reconstructed residual block may be produced.

In case of the intra mode, the intra prediction unit 240 may produce a prediction block by performing spatial prediction using a pixel value of an already decoded block adjacent to the current block. In case of the inter mode, the motion compensation unit 250 may perform motion compensation using the reference picture stored in the reference picture buffer 270 and the motion vector to thereby produce the prediction block.

In case of the inter mode, a candidate prediction motion vector list may be generated based on a plurality of spatial candidate prediction motion vectors induced from an adjacent prediction block of a prediction target block and information relating to a temporal candidate prediction motion vector determined based on information on the plurality of spatial candidate prediction motion vectors. A method of generating the candidate prediction motion vector list will be described below in detail, and the decoding apparatus including the prediction unit that performs such operation is included in the embodiments of the present invention.

The reconstructed residual block and the prediction block are added to each other by the adder 255, and the added blocks may go through the filter unit 260. The filter unit 260 may apply at least one or more of a deblocking filter, SAO, and ALF to the reconstructed block or reconstructed picture. The filter unit 260 may output the reconstructed picture, i.e., the decoded picture. The reconstructed picture is stored in the reference picture buffer 270 and may be used for inter mode.

To enhance prediction performance of the encoding/decoding apparatuses, there are a method of elevating accuracy of the interpolation picture and a method of predicting a difference signal. Here, the "difference signal" may be, depending on the context, referred to as "residual signal", "residual block", or "differential block", which may be distinguished from each other by those skilled in the art within the scope of not affecting the scope or gist of the invention.

As described above, although for ease of description the coding unit is hereinafter used as a unit in which encoding is performed, the coding unit may be also a unit in which decoding as well as encoding is performed. Further, the "unit" or "block" hereinafter refers to a unit in which video encoding and decoding are performed, and the "encoding or decoding unit" when video encoding and decoding are performed refers to a unit that is obtained by splitting one picture for encoding or decoding. Thus, the encoding or decoding unit may be also referred to as "macroblock", "coding unit (CU)", "prediction unit (PU)", "transform unit (TU)", or "transform block". One block may be split into smaller subblocks. The prediction unit is a basic block for performing prediction/compensation, and the prediction unit may be split to a plurality of partitions. The plurality of partitions may be a basic block for performing prediction, and the partition obtained by splitting the prediction unit is also referred to as the prediction unit.

The video encoding method and video decoding method to be described below according to embodiments of the present invention may be performed by each component included in the video encoding apparatus and video decoding apparatus described above in connection with FIGS. 1 and 2. Each component may be implemented in hardware and also may include a processing unit implemented in software, which may be executed through an algorithm.

Figure 3:
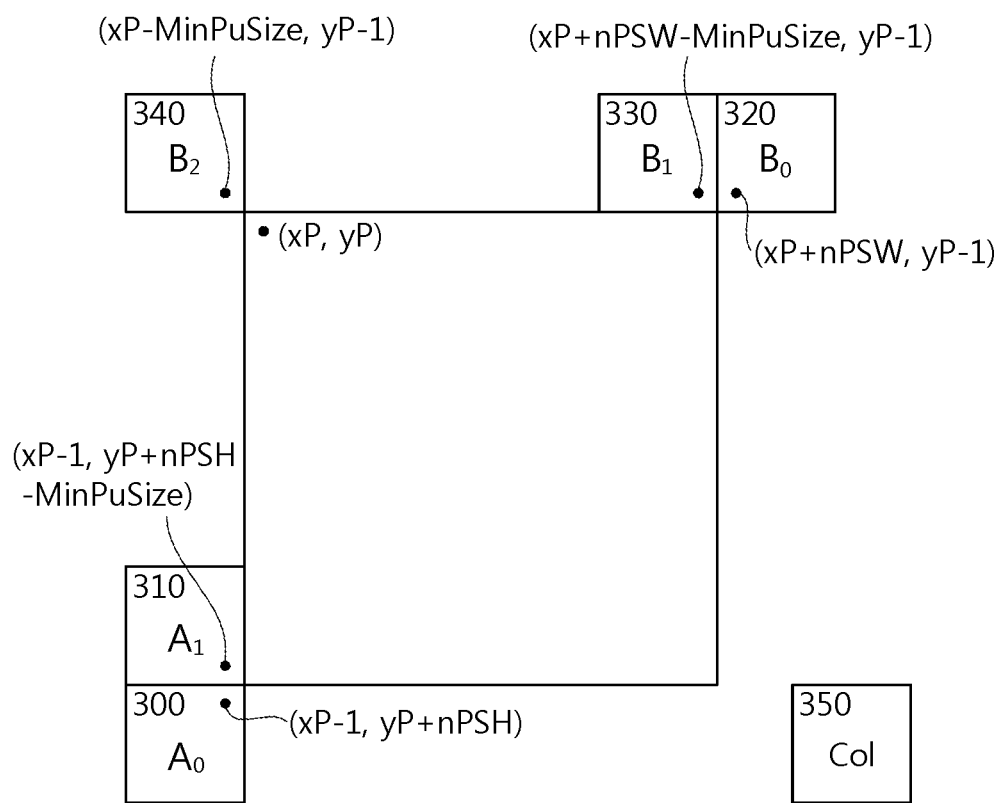
FIG. 3 is a concept view illustrating spatial candidate prediction blocks and temporal candidate prediction blocks to produce a candidate prediction motion vector according to an embodiment of the present invention.

FIG. 3 is a concept view illustrating spatial candidate prediction blocks and temporal candidate prediction blocks to produce a candidate prediction motion vector according to an embodiment of the present invention.

The position of a pixel positioned at the upper and left end of a prediction target block is defined as (xP, yP), the width of the prediction target block is defined as nPSW, and the height of the prediction target block is defined as nPSH. MinPuSize may refer to the size of the smallest prediction block.

Hereinafter, according to an embodiment of the present invention, as the spatial adjacent prediction blocks of the prediction target block, a block including a pixel positioned at (xP−1, yP+nPSH) is defined as a left first block (A0 block, 300), and a block including a pixel positioned at (xP−1, yP+nPSH-MinPuSize) is defined as a left second block (A1 block, 310). A block including a pixel positioned at (xP+nPSW, yP−1) is defined as an upper first block (B0 block, 320), a block including a pixel positioned at (xP+nPSW-MinPuSize, yP−1) is defined as an upper second block (B1 block, 330), and a block including a pixel positioned at (xP-MinPuSize, yP−1) is defined as an upper third block (B2 block, 340).

The spatial candidate prediction blocks may include the left first block (A0, 300), the left second block (A1, 310), the upper first block (B0, 320), the upper second block (B1, 330), and the upper third block (B2, 340). The spatial candidate prediction blocks may be divided into two groups including a first spatial candidate prediction group including the left first block 300 and the left second block 310 and a second spatial candidate prediction group including the upper first block 320, the upper second block 330, and the upper third block 340.

The temporal candidate prediction block 350 is a prediction block including a pixel positioned at (xP+nPSW, yP+nPSH) in the collocated picture of the current prediction block based on the pixel position (xP, yP) in the picture including the current prediction target block, or in case the prediction block including the pixel positioned at (xP+nPSW, yP+nPSH) is not available, a prediction block including the pixel positioned at (xP+(nPSW>>1), yP+(nPSH>>1)). In the collocated picture, the prediction block including the pixel positioned at (xP+nPSW, yP+nPSH) is referred to as the first collocated block, and in the collocated picture, the prediction block including the pixel positioned at (xP+(nPSW>>1), yP+(nPSH>>1)) is referred to as the second collocated block.

The position and number of the spatial candidate prediction blocks and the position and number of the temporal candidate prediction blocks may be arbitrarily determined and may vary without departing from the gist of the present invention. Further, the orders of prediction blocks scanned when configuring the candidate prediction motion vector list may vary as well. That is, the position, number, scanning order, and candidate prediction group of the candidate prediction blocks used to configure the candidate prediction motion vector list described below may vary without departing from the gist of the present invention. At this time, the candidate prediction motion vector list means a list consisting of the candidate prediction motion vectors.

Figure 4:
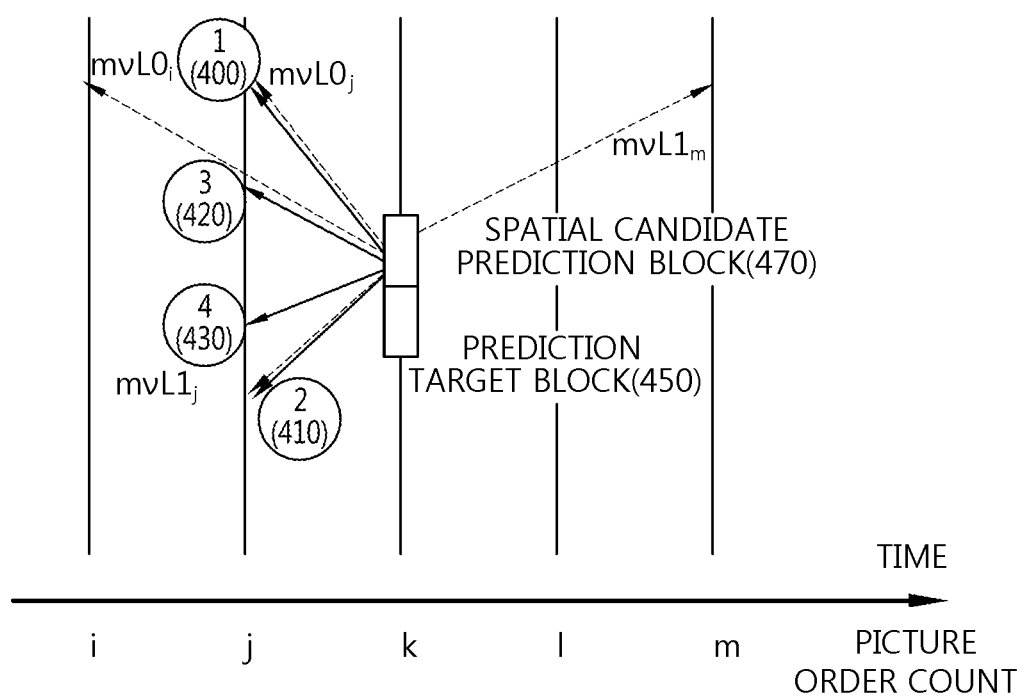
FIG. 4 is a concept view illustrating a method of classifying motion vectors of spatial candidate prediction blocks through a relationship between the motion vector of the prediction target block and the motion vector of the spatial candidate prediction block according to an embodiment of the present invention.

FIG. 4 is a concept view illustrating a method of classifying motion vectors of spatial candidate prediction blocks through a relationship between the motion vector of the prediction target block and the motion vector of the spatial candidate prediction block according to an embodiment of the present invention.

Referring to FIG. 4, a motion vector of a spatial candidate prediction block produced from the same reference frame and the same reference picture list as the prediction target block is referred to as a first motion vector 400. Referring to FIG. 4, assume that the reference picture of the prediction target block 450 is picture j, and the reference picture list including the picture j is list L0, the reference picture indicated by the vector 400 of the spatial candidate prediction block 470 is the picture j, and the reference picture list including the picture j is list L0, and thus, the motion vector of the spatial candidate prediction block 470 and the motion vector of the prediction target block have the same reference picture and the same reference picture list. As such, the motion vector produced from the same reference frame and the same list as the prediction target block is defined as the first motion vector 400.

The motion vector of the spatial candidate prediction block 470 that has the same reference frame as the prediction target block 450 and that is produced from different reference picture lists is referred to as a second motion vector 410. Assuming that the reference picture of the prediction target block 450 is picture j and the reference picture list including the picture j is list L0, the reference picture indicated by the vector of the spatial candidate prediction block 470 is picture j and the reference picture list including the picture j is list L1, and thus, the motion vector 410 of the spatial candidate prediction block and the motion vector of the prediction target block have the same reference picture but different reference picture lists. As such, the motion vector that has the same reference frame as the prediction target block but that is produced from the different lists is defined as the second motion vector 410.

The motion vector of the spatial candidate prediction block that has a different reference frame from that of the prediction target block and that is produced from the same reference picture list is referred to as a third motion vector 420. Assuming that the reference picture of the prediction target block 450 is picture j and the reference picture list including the picture j is list L0, the reference picture indicated by the vector 420 of the spatial candidate prediction block 470 is picture I and the reference picture list including the picture I is list L0, and thus, the motion vector of the spatial candidate prediction block and the motion vector of the prediction target block have different reference pictures but the same reference picture list. As such, the motion vector that has a different reference frame from that of the prediction target block 450 but is produced from the same list is defined as the third motion vector 420. Since the third motion vector 420 has a different reference picture from that of the prediction target block, when the motion vector of the spatial candidate prediction block is used, it may be scaled based on the reference picture of the prediction target block and then may be included in the candidate prediction motion vector list.

The motion vector of the spatial candidate prediction block 470 that has a different reference frame from that of the prediction target block 450 and is produced from a different reference picture list is referred to as a fourth motion vector 430. Assuming that the reference picture of the prediction target block 450 is picture j and the reference picture list including picture j is list L0, the reference picture indicated by the vector 430 of the spatial candidate prediction block 470 is picture m, and the reference picture list including picture m is list L1, the motion vector of the spatial candidate prediction block and the motion vector of the prediction target block have different reference pictures and different reference picture lists. As such, the motion vector that is produced from a different reference frame and a different reference picture list from those of the prediction target block is defined as the fourth motion vector 430. The fourth motion vector 430 has a different reference picture from that of the prediction target block 450, and thus, when the motion vector of the spatial candidate prediction block is used, it is scaled based on the reference picture of the prediction target block and then may be included in the candidate prediction motion vector list.

The motion vector of the spatial candidate prediction block may be categorized into the first motion vector to the fourth motion vector depending on the reference frame and the reference picture list of the prediction target block as described above. The first motion vector and the second motion vector are vectors that may be used without scaling, and are defined as non-scaling motion vectors that have not undergone scaling. The third and fourth motion vectors are vectors that may be used without scaling and are defined as scaling-motion vectors.

The method of categorizing the motion vector of the spatial candidate prediction block into the first motion vector to the fourth motion vector may be used to determine which one of the motion vectors of the spatial candidate prediction block is to be first used as the candidate prediction motion vector which is to be described below.

Hereinafter, among the candidate prediction motion vectors, such as the first motion vector to the fourth motion vector, the motion vector selected as the optimal motion vector may be defined as the prediction motion vector.

Figure 5:
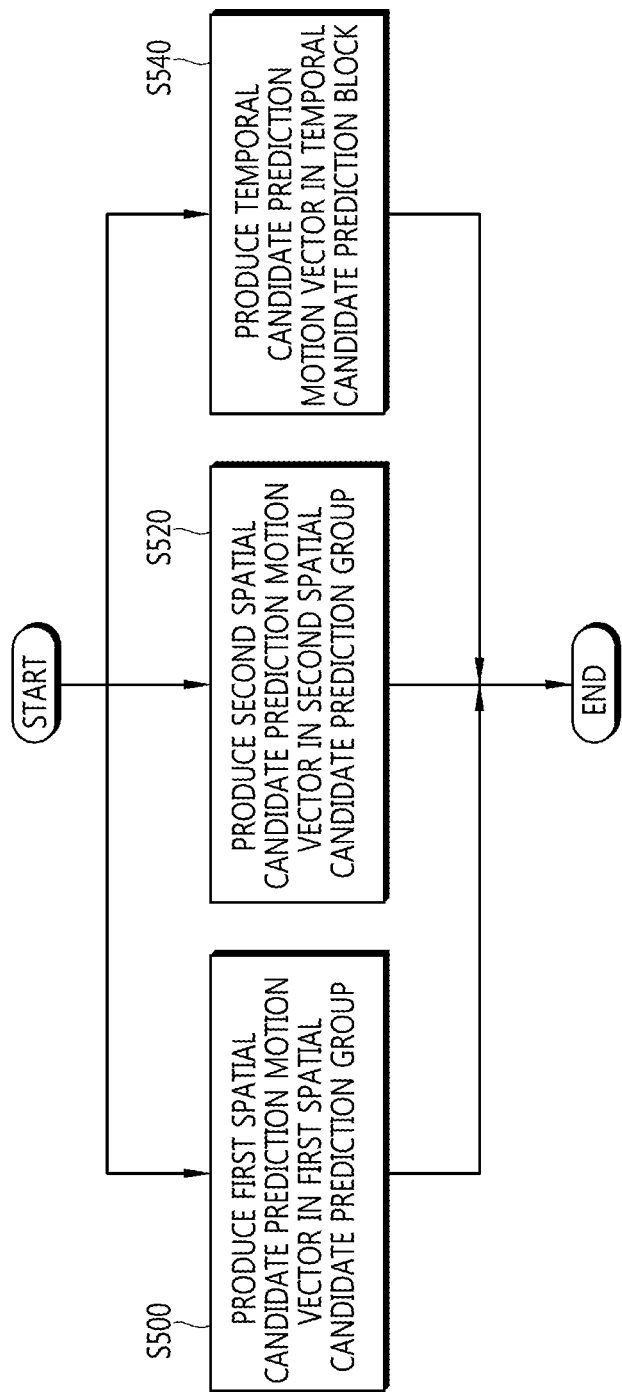
FIG. 5 is a flowchart illustrating a method of producing a candidate prediction motion vector according to an embodiment of the present invention.

FIG. 5 is a flowchart illustrating a method of producing a candidate prediction motion vector according to an embodiment of the present invention.

The candidate prediction motion vector conceptually includes at least one or more of a spatial candidate prediction motion vector and a temporal candidate prediction motion vector.

According to an embodiment of the present invention, in the method of producing a candidate prediction motion vector, processes of inducing the candidate prediction motion vector may be performed in parallel. For example, in case that one candidate prediction motion vector is induced from each of two spatial candidate prediction groups (first spatial candidate prediction group and second spatial candidate prediction group) and one candidate prediction motion vector is induced from a temporal candidate prediction block, the operations of inducing the candidate prediction motion vectors from the first spatial candidate prediction group, the second spatial candidate prediction group, and the temporal candidate prediction block may be performed in parallel. "the processes of inducing the candidate prediction motion vector are performed in parallel" means that complexity of the process of inducing the candidate prediction motion vector may be reduced.

Referring to FIG. 5, a step of producing a first spatial candidate prediction motion vector in a first spatial candidate prediction group (step S500), a step of producing a spatial candidate prediction motion vector in a second spatial candidate prediction group (step S520), and a step of producing a temporal candidate prediction motion vector in a temporal candidate prediction block (step S540) are performed in parallel.

The steps of producing the candidate prediction motion vectors performed in parallel as shown in FIG. 5 are arbitrarily defined, and other methods may be adopted without departing from the gist of the present invention that induces the candidate prediction motion vectors in parallel. For example, the step of producing the candidate prediction motion vector in the temporal candidate prediction block may be omitted while the step of producing the candidate prediction motion vector in the first spatial candidate prediction group and the step of producing the candidate prediction motion vector in the second spatial candidate prediction group only may be performed in parallel.

In the method of inducing the candidate prediction motion vector according to an embodiment of the present invention, A) method of using as the candidate prediction motion vector only the non-scaling motion vectors (first motion vector or second motion vector) that is not subjected to scaling, and B) method of using as the candidate prediction motion vector the third motion vector or fourth motion vector that is not subjected to scaling in case no non-scaling motion vectors (first motion vector or second motion vector) are available may be adopted to produce the candidate prediction motion vector.

Figure 6:
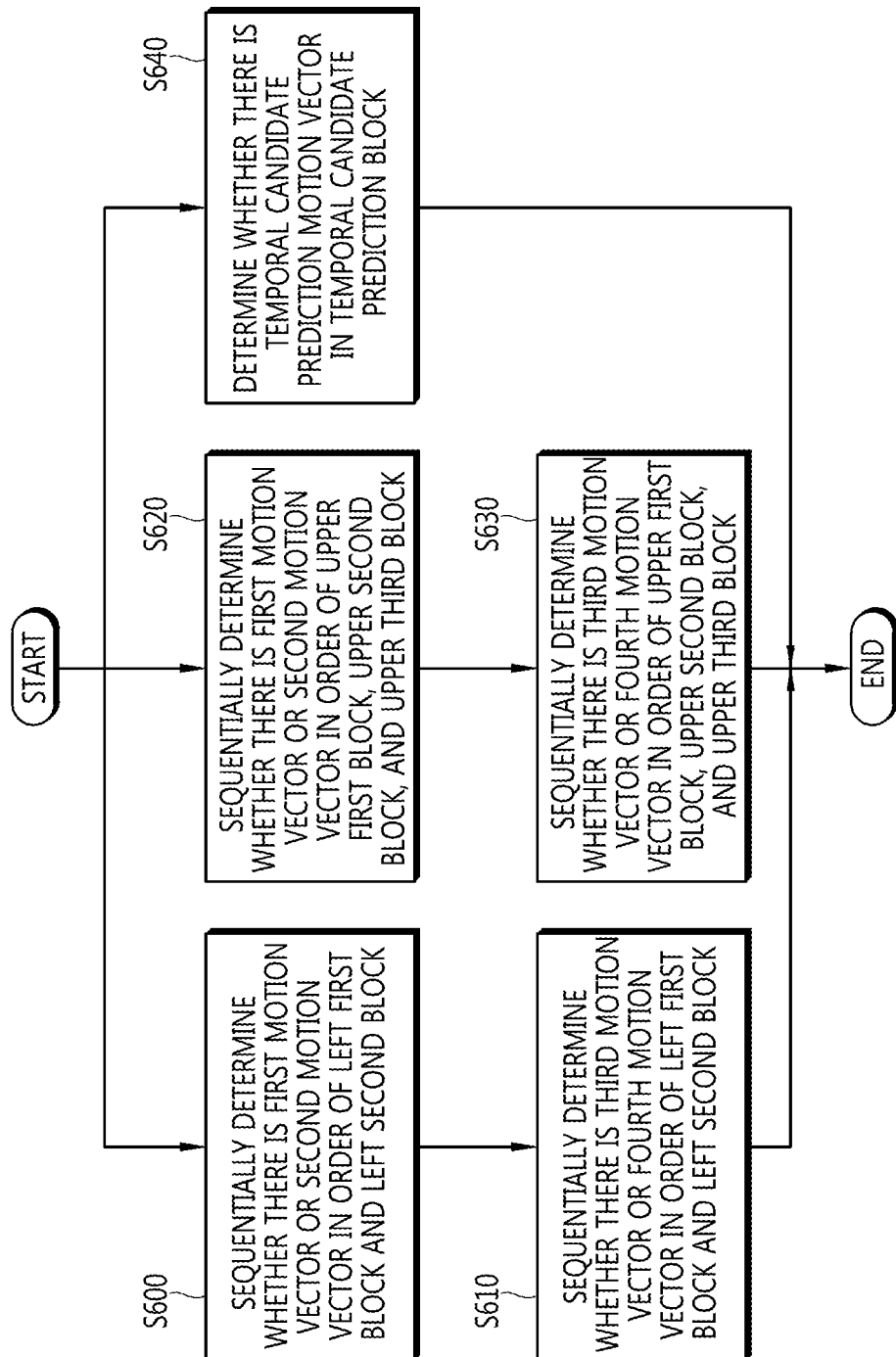
FIG. 6 is a flowchart illustrating a method of producing a candidate prediction motion vector according to another embodiment of the present invention.

FIG. 6 is a flowchart illustrating a method of producing a candidate prediction motion vector according to another embodiment of the present invention.

Referring to FIG. 6, it is sequentially determined whether there is a non-scaling motion vector (first motion vector or second motion vector) in order from the left first block to the left second block (step S600).

As described above, the first motion vector and the second motion vector refer to non-scaling candidate prediction motion vectors that have the same reference picture index and do not need to be subjected to scaling.

In step S600, for example, it may be determined in the following order whether there is a candidate prediction motion vector:

(1) it is determined whether there is a non-scaling candidate prediction motion vector in the left first block, and in case there is a non-scaling candidate prediction motion vector in the left first block, the corresponding non-scaling candidate prediction motion vector is determined as the candidate prediction motion vector.

(2) in case no non-scaling candidate prediction motion vector is available in the left first block, it is determined whether there is a non-scaling candidate prediction motion vector in the left second block. In case there is a non-scaling candidate prediction motion vector in the left second block, the corresponding non-scaling candidate prediction motion vector is determined as the candidate prediction motion vector.

(3) in case no non-scaling candidate prediction motion vector is in the left second block, no candidate prediction motion vector may be produced from the first spatial candidate prediction group (left first block and left second block).

As another example, in step S600, it may be determined in the following order whether there is a candidate prediction motion vector:

(1) it is determined whether the first motion vector is in the left first block, and in case there is the first motion vector in the first block, the corresponding vector is determined as the candidate prediction motion vector.

(2) in case there is no first motion vector in the left first block, it is determined whether the first motion vector is in the second block, and in case there is the first motion vector in the left second block, the corresponding vector is determined as the candidate prediction motion vector.

(3) in case there is no first motion vector in the left second block, it is determined whether the second motion vector is in the left first block, and in case there is a second motion vector in the left first block, the corresponding vector is determined as the candidate prediction motion vector.

(4) in case there is no second motion vector in the left first block, it is determined whether the second motion vector is in the left second block, and in case there is the second motion vector in the left second block, the corresponding vector is determined as the candidate prediction motion vector.

The above-described order is merely an example of an order in which the non-scaling candidate prediction motion vector is produced from the first spatial candidate prediction group, and in other orders, the non-scaling candidate prediction motion vector may be produced from the first spatial candidate prediction group.

As described above, in case no non-scaling candidate prediction motion vector is available in step S600, the candidate prediction motion vector may be not produced from the first spatial candidate prediction group (left first block and left second block).

In case there is a non-scaling candidate prediction motion vector in the first spatial candidate prediction group through the method of producing the non-scaling candidate prediction motion vector, first spatial candidate prediction group availability information (for example, availableFlagLXY) is set as 1 to indicate that there is the candidate prediction motion vector in the first spatial candidate prediction group. "1" may be a binary numeral to indicate whether there is the candidate prediction motion vector, and other binary numerals may be used to indicate the same. In an embodiment of the present invention, binary numerals "1" and "0" which indicate predetermined information are arbitrarily determined, and the corresponding information may be represented based on codes produced by other binary encoding or decoding methods.

According to another embodiment, in case no non-scaling candidate prediction motion vector is produced in step S600, it is sequentially determined whether there is the scaling motion vector (third motion vector or fourth motion vector) in the left first block and left second block (step S610).

For example, it may be determined by the sub-steps in step S610 whether there is the scaling motion vector:

(1) it is sequentially determined whether there is the third motion vector or fourth motion vector in the left first block, and in case there the third motion vector or fourth motion vector is in the left first block, the third motion vector or fourth motion vector is determined as the candidate prediction motion vector without scaling.

(2) in case there is no third motion vector or fourth motion vector in the left first block, it is sequentially determined whether the third motion vector or fourth motion vector is in the left second block, and in case there is the third motion vector or fourth motion vector in the left second block, the corresponding third motion vector or fourth motion vector is determined as the candidate prediction motion vector without scaling.

That is, in case there is no non-scaling candidate prediction motion vector in the first spatial candidate prediction group, the scaling candidate prediction motion vector (third motion vector or fourth motion vector) is produced from the first spatial candidate prediction group (left first block and left second block), and in such case, the motion vector that has not been subjected to scaling may be produced as the candidate prediction motion vector.

As the method of sequentially determining whether there is the scaling candidate prediction motion vector (third motion vector or fourth motion vector) in the left first block and left second block in step S610, various methods, for example, the above-described method of producing the scaling motion vector (first motion vector or second motion vector) in the left first block and the left second lock, may be adopted, which are also included in the scope of the present invention.

In case there is a motion vector satisfying the conditions through step S600 or steps S600 and S610, the first spatial candidate prediction group availability information is set as 1, and a process of determining whether there is its subsequent motion vector may not be performed.

The same method may apply to the second spatial candidate prediction group to produce the candidate prediction motion vector.

It is determined whether there is a non-scaling motion vector in order of the upper first block, the upper second block, and the upper third block (step S620).

The step S620 of producing the candidate prediction motion vector in the second spatial candidate prediction group may be performed in parallel with at least one of steps S600 and S610 of producing the candidate prediction motion vector in the first spatial candidate prediction group as described above.

For example, similar to the method described above in connection with step S600, in step S620, it is determined whether there is the first motion vector in order of the upper first block to the upper third block, and in case there is no first motion vector in the upper first block to the upper third block, it is determined whether there is the second motion vector in order from the upper first block to the upper third block or it is determined whether there is the first motion vector or the second motion vector in the upper first block, and then it is determined whether there is the first motion vector or the second motion vector in the upper second block, and it is determined whether there is the first motion vector or the second motion vector in the third block. By such method, the spatial candidate prediction motion vector may be produced.

The determination processes in step S620 may be performed by various methods as in step S600, which are all included in the scope of the present invention.

In case there is a candidate prediction motion vector satisfying the condition in the upper first block to the upper third block based on the sequential determination processes in step S620, its subsequent determination process may be skipped. The produced motion vector may be included in the candidate prediction motion vector list, and the second spatial candidate prediction group availability information may be set as 1 to indicate there is the candidate prediction motion vector in the second spatial candidate prediction group.

Like in step S600, in case there is no first motion vector or second motion vector, which is the non-scaling candidate prediction motion vector, in the upper first block to the upper third block through step S620, the candidate prediction motion vector may not be produced from the second spatial candidate prediction group.

According to another embodiment, in case it is determined in step S620 that there is no non-scaling motion vector in the upper first block, the upper second block, and the upper third block, it is determined whether there is the scaling motion vector (third motion vector and fourth motion vector) in the upper first block, the upper second block, and the upper third block.

In case as a result of sequentially determining in step S620 whether there is the first motion vector or the second motion vector in order from the upper first block to the upper third block there is no vector satisfying the condition, the candidate prediction motion vector may be produced through step S630.

In case it is determined in step S630 that the third motion vector or the fourth motion vector is available in at least one of the upper first block, the upper second block, and the upper third block, scaling is not performed on the corresponding vector, and the third motion vector and fourth motion vector, which have not subjected to scaling, may be included in the candidate prediction motion vector list.

The process of determining whether there is the third motion vector or the fourth motion vector in at least one of the upper first block, the upper second block, and the upper third block may be performed by various methods, such as the method of producing the motion vector in the first spatial candidate prediction group.

In case there is a motion vector satisfying the condition through steps S620 and S630, one candidate prediction motion vector may be produced from the second spatial candidate prediction group.

It is determined whether there is a candidate prediction motion vector in the temporal candidate prediction block (collocated block) (step S640).

The step S640 of determining whether there is the candidate prediction motion vector in the temporal candidate prediction block may be performed in parallel with step S600 or S610 of producing the candidate prediction motion vector in the first spatial candidate prediction group and step S620 or S630 of producing the candidate prediction motion vector in the second spatial candidate prediction group.

The temporal candidate prediction block may be divided into a first collocated block and a second collocated block as described above, and it is determined whether the collocated block is available, and if the first collocated block is not available, the second collocated block may be selected as the collocated block.

Depending on predetermined information, one of the reference pictures in the reference picture list of the current picture may become the collocated picture including the temporal candidate prediction block. In addition, various methods of producing the collocated picture including the temporal candidate prediction block may be used. The temporal candidate prediction block using two reference picture lists may first use as the candidate prediction motion vector only the motion vector that is available in one list according to predetermined flag information. In case the distance between the current picture and the reference picture of the current picture is different from the distance between the picture including the temporal candidate prediction block and the reference picture of the temporal candidate prediction block, scaling may be performed on the candidate prediction motion vector produced in the temporal candidate prediction block.

According to an embodiment of the present invention, no scaling may be performed on the temporal candidate prediction block (collocated block). For example, in case calculation complexity needs to be reduced, the temporal candidate prediction block may not be subjected to scaling by not performing scaling or through a setting method in which no scaling is adaptively performed on the motion vector of the collocated block through flag information.

In case the candidate prediction motion vector produced from the temporal candidate prediction block may be produced, the temporal candidate prediction block availability information may be set as 1.

That is, according to an embodiment of the present invention, the processes of determining whether there are available candidate prediction motion vectors in the first spatial candidate prediction group, the second spatial candidate prediction group, and the temporal candidate prediction block are performed in parallel to thereby remove dependency that occurs when the candidate prediction motion vector is produced in the first spatial candidate prediction group, the second spatial candidate prediction group, and the temporal candidate prediction block when producing the candidate prediction motion vector.

Further, in determining whether there are available candidate prediction motion vectors in the first spatial candidate prediction group, the second spatial candidate prediction group, and the temporal candidate prediction block, only the processes of determining in parallel whether there are available candidate prediction motion vectors in the first spatial candidate prediction group and the second spatial candidate prediction group may be performed, while the process of determining whether there is a candidate prediction motion vector available in the temporal candidate prediction block is dependently performed. As such, when producing the candidate prediction motion vectors in the first spatial candidate prediction group, the second spatial candidate prediction group, and the temporal candidate prediction block, the processes of producing the candidate prediction motion vectors only from at least two of the groups may be performed in parallel.

In case there are motion vectors that may be produced in the first spatial candidate prediction group, the second spatial candidate prediction group, and the temporal candidate prediction block via the above-described process, it may be indicated by using availability information flag (availableFlagLXY or availableFlagCol) that there are available candidate prediction motion vectors.

As described above, in producing the candidate prediction motion vector, the number and position of the blocks included in the first spatial candidate prediction group, the number and position of the blocks included in the second spatial candidate prediction group, and the number and position of the temporal candidate prediction blocks are arbitrarily determined, and the number and position of the blocks included in the first and second spatial candidate prediction groups may vary, which is also included in the scope of the present invention.

Figure 7:
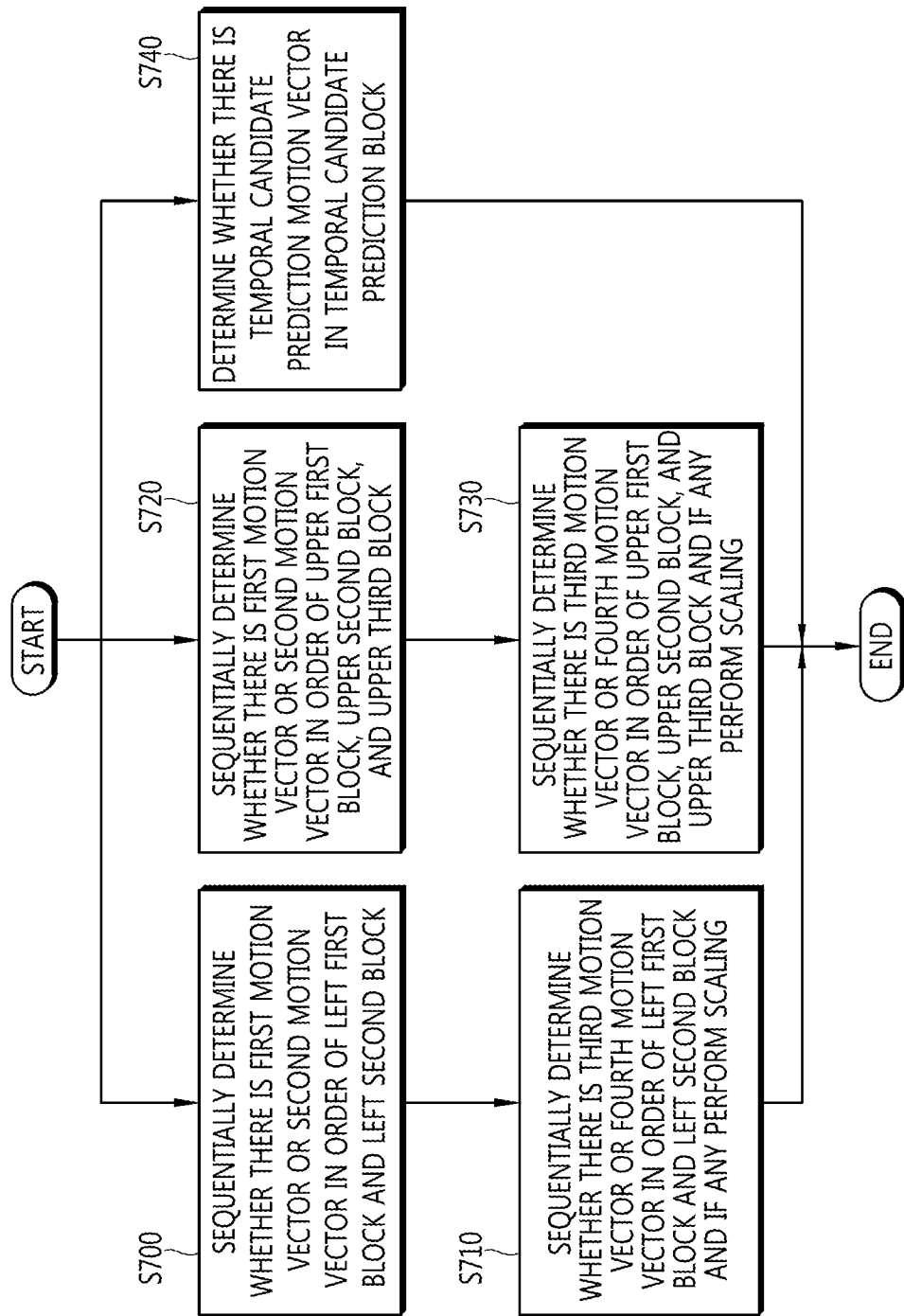
FIG. 7 is a flowchart illustrating a method of producing a candidate prediction motion vector according to still another embodiment of the present invention.

FIG. 7 is a flowchart illustrating a method of producing a candidate prediction motion vector according to still another embodiment of the present invention.

According to an embodiment of the present invention, when the candidate prediction motion vectors are induced from the first spatial candidate prediction group and the second spatial candidate prediction group, irrespective of whether scaling has been performed on the motion vector produced from a different candidate prediction block, scaling may be individually performed so that the candidate prediction motion vector may be induced in parallel.

The candidate prediction motion vector is induced from the first spatial candidate prediction group (left first block, left second block).

To induce the candidate prediction motion vector from the first spatial candidate prediction group, it may be determined whether there is a non-scaling motion vector (first motion vector or second motion vector) in the first spatial candidate prediction group (step S700).

The method described above in connection with step S600 may be used to determine whether there is the non-scaling motion vector (first motion vector or second motion vector) in the first spatial candidate prediction group.

To induce the candidate prediction motion vector in the first spatial candidate prediction group, it may be determined whether there is the scaling motion vector (third motion vector or fourth motion vector) in the first spatial candidate prediction group (step S710).

In case it is determined in step S700 that there is no non-scaling motion vector, it is determined whether there is a scaling motion vector (third motion vector or fourth motion vector), the scaling motion vector (third motion vector or fourth motion vector) may be selected as the candidate prediction motion vector.

In step S710, various methods, such as the method described in connection with step S610, may be used to determine whether there is the third motion vector or the fourth motion vector in the first spatial candidate prediction group, and in step S710, unlike in step S610, scaling is first performed and the produced third motion vector and the fourth motion vector may be used as the candidate prediction motion vector.

The candidate prediction motion vector is induced from the second spatial candidate prediction group (upper first block, upper second block, and upper third block).

To induce the candidate prediction motion vector in the second spatial candidate prediction group, it may be determined whether there is a non-scaling motion vector (first motion vector or second motion vector) in the second spatial candidate prediction group (step S720).

The method described above in connection with step S620 may be used to determine whether there is the non-scaling motion vector (first motion vector or second motion vector) in the second spatial candidate prediction group.

To induce the candidate prediction motion vector in the second spatial candidate prediction group, it may be determined whether there is the scaling motion vector (third motion vector or fourth motion vector) in the second spatial candidate prediction group (step S730).

In case it is determined in step S720 that there is no non-scaling motion vector, the scaling motion vector (third motion vector or fourth motion vector) may be selected as the candidate prediction motion vector.

It may be determined in step S730 by various methods, such as the method described above in connection with step S630, whether there is the third motion vector or the fourth motion vector in the second spatial candidate prediction group, and in step S730, unlike in step S630, scaling is first performed and the produced third motion vector or fourth motion vector may be used as the candidate prediction motion vector.

Scaling may be independently performed on the third motion vector or fourth motion vector produced in the second spatial candidate prediction group irrespective of whether scaling has been performed in the first spatial candidate prediction group to produce the candidate prediction motion vector.

It is determined whether there is a candidate prediction motion vector in the temporal candidate prediction block (collocated block) (step S740).

Step S740 of determining whether there is the candidate prediction motion vector in the temporal candidate prediction block may be performed in parallel with step S700 or S710 of producing the candidate prediction motion vector in the first spatial candidate prediction group and step S720 or S730 of producing the candidate prediction motion vector in the second spatial candidate prediction group.

The temporal candidate prediction block may be divided into a plurality of candidate prediction blocks, such as the first collocated block and the second collocated block as described above, and if one temporal candidate prediction motion vector is produced from the temporal candidate prediction block, it is determined whether the first collocated block is available and if the first collocated block is not available, the second collocated block may be selected as the collocated block.

According to an embodiment of the present invention, scaling may be independently performed on the candidate prediction motion vector produced from the temporal candidate prediction block without determining whether scaling has been performed on the candidate prediction motion vector produced from the first spatial candidate prediction group and the candidate prediction motion vector produced from the second spatial candidate prediction group. Further, as another method, no scaling may be performed on the temporal candidate prediction block (collocated block). For example, in case calculation complexity needs to be reduced, the scaling may not be performed on the temporal candidate prediction block through a setting method in which no scaling is performed or no scaling is adaptively performed on the motion vector of the collocated block through flag information. In case there is the candidate prediction motion vector in the first spatial candidate prediction group, the second spatial candidate prediction group, or the temporal candidate prediction block through the above process, the availability information flag (availableFlagLXY or availableFlagCol) may be used to indicate that there is the candidate prediction motion vector.

As described above in connection with FIG. 6, in producing the candidate prediction motion vector, the number and position of the blocks included in the first spatial candidate prediction group, the number and position of the blocks included in the second spatial candidate prediction group, and the number and position of the temporal candidate prediction blocks are arbitrarily determined, and the number and position of the blocks included in the first and second spatial candidate prediction groups may vary, which is also included in the scope of the present invention.

As described in connection with FIG. 7, scaling may be performed on both the first spatial candidate prediction group and the second spatial candidate prediction group. According to an embodiment of the present invention, however, scaling may be performed on only at least one of the first spatial candidate prediction group or the second spatial candidate prediction group.

For example, scaling may be performed only on the first spatial candidate prediction group. In case scaling is performed only on the first spatial candidate prediction group, it is similar to what is described above in connection with FIG. 7. However, in step S730 of FIG. 7, to induce the candidate prediction motion vector in the second spatial candidate prediction group, it is determined whether there is a scaling motion vector (third motion vector or fourth motion vector) in the second spatial candidate prediction group, and then, without performing scaling on the scaling motion vector (third motion vector or fourth motion vector), the third motion vector or fourth motion vector which has not been subjected to scaling may be used as the candidate prediction motion vector.

In the same way, scaling may be performed only on the second spatial candidate prediction group. In such case, to induce the candidate prediction motion vector in the first spatial candidate prediction group in step S710, it is determined whether there is the scaling motion vector (third motion vector or fourth motion vector) in the first spatial candidate prediction group, and then, without performing scaling on the scaling motion vector (third motion vector or fourth motion vector), the third motion vector or fourth motion vector that has not been subjected to scaling may be used as the candidate prediction motion vector.

As another example, predetermined flag information indicating whether scaling is performed may be used so that scaling may be used at once on the candidate prediction motion vector. For example, in case scaling is performed once on the first spatial candidate prediction group, no scaling is done on the second spatial candidate prediction group, and in case no scaling is performed on the first spatial candidate prediction group, flag information may be used to indicate whether scaling is done so that scaling may be used for the second spatial candidate prediction group.

Figure 8:
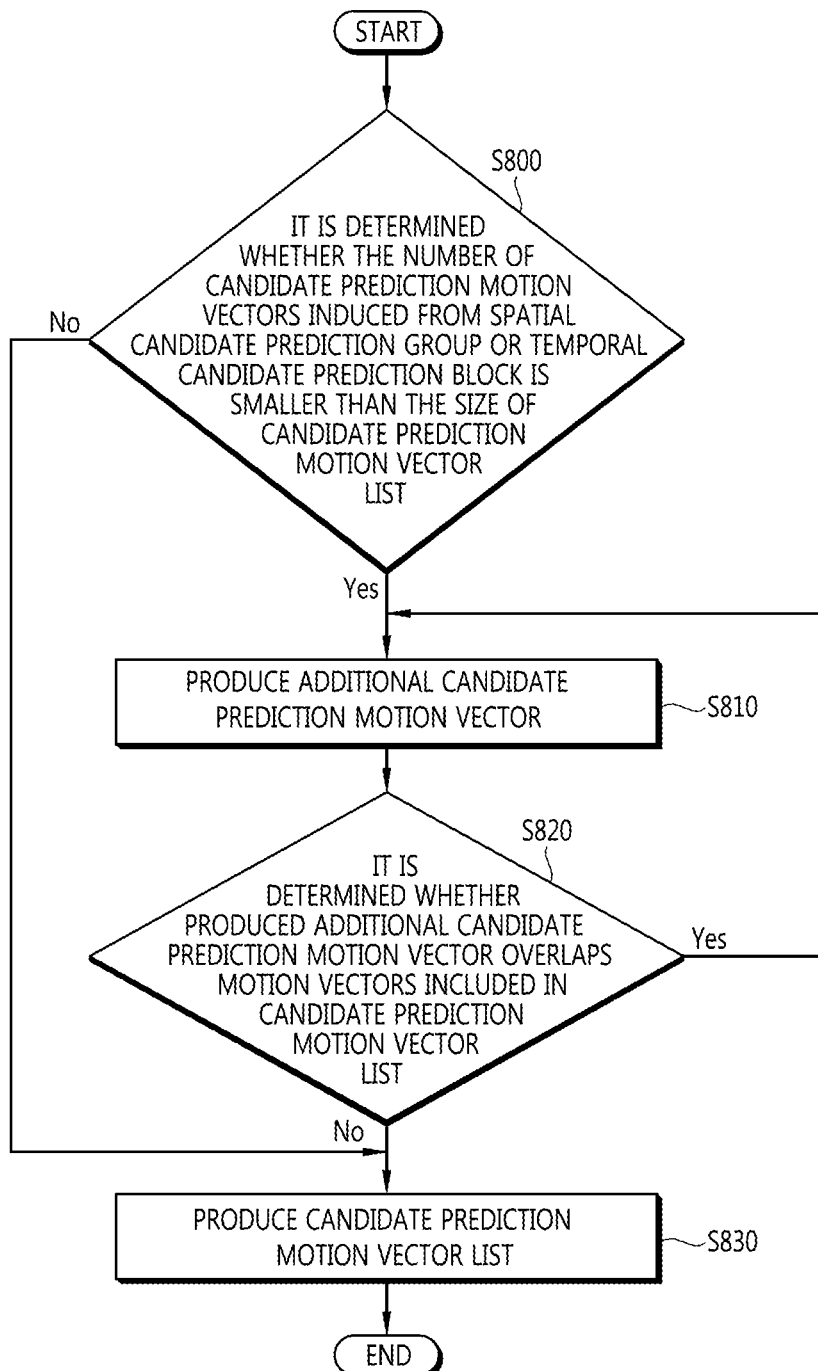
FIG. 8 is a flowchart illustrating a process of producing an additional candidate prediction motion vector according to an embodiment of the present invention.

FIG. 8 is a flowchart illustrating a process of producing an additional candidate prediction motion vector according to an embodiment of the present invention.

FIG. 8 discloses a method of adding an additional candidate prediction motion vector in a candidate prediction motion vector list in case the number of candidate prediction motion vectors included in the current candidate prediction motion vector list is not the maximum based on the number of the candidate prediction motion vectors that may be included in the candidate prediction motion vector list. The method of adding the additional candidate prediction motion vector to the candidate prediction motion vector list may be used to enhance encoding efficiency upon prediction of the motion vector.

Referring to FIG. 8, it is determined whether the number of candidate prediction motion vectors induced from a spatial candidate prediction group or a temporal candidate prediction block is smaller than the size of candidate prediction motion vector list (step S800).

In case the number of induced candidate prediction motion vectors is the same as the number of candidate prediction motion vectors that may be included in the candidate prediction motion vector list, the induced candidate prediction motion vectors only may be included in the candidate prediction motion vector list and may be used as candidate prediction motion vectors of the prediction target block. Hereinafter, in this embodiment of the present invention, the number of the induced candidate prediction motion vectors refers to the number of candidate prediction motion vectors that remain after duplicate candidate prediction motion vectors are removed from the candidate prediction motion vectors induced from the spatial candidate prediction group and the temporal candidate prediction block.

In case the number of the induced candidate prediction motion vectors is smaller than the number of the candidate prediction motion vectors that may be included in the candidate prediction motion vector list, an additional candidate prediction motion vector is produced (step S810).

Various methods of producing the additional candidate prediction motion vector, such as a method of performing scaling, a method of using an offset, or a method of using a statistical result, may be used. Hereinafter, a method of producing an additional candidate prediction motion vector according to an embodiment of the present invention is described below in detail.

It is determined whether the produced additional candidate prediction motion vector overlaps the motion vector included in the candidate prediction motion vector list (step S820).

In case the produced additional candidate prediction motion vector overlaps the motion vector included in the candidate prediction motion vector list, a new additional candidate prediction motion vector is induced (step S810).

In case the produced additional candidate prediction motion vector does not overlap the motion vector included in the candidate prediction motion vector list, the produced additional candidate prediction motion vector is included in the candidate prediction motion vector list (step S830).

Figure 9:
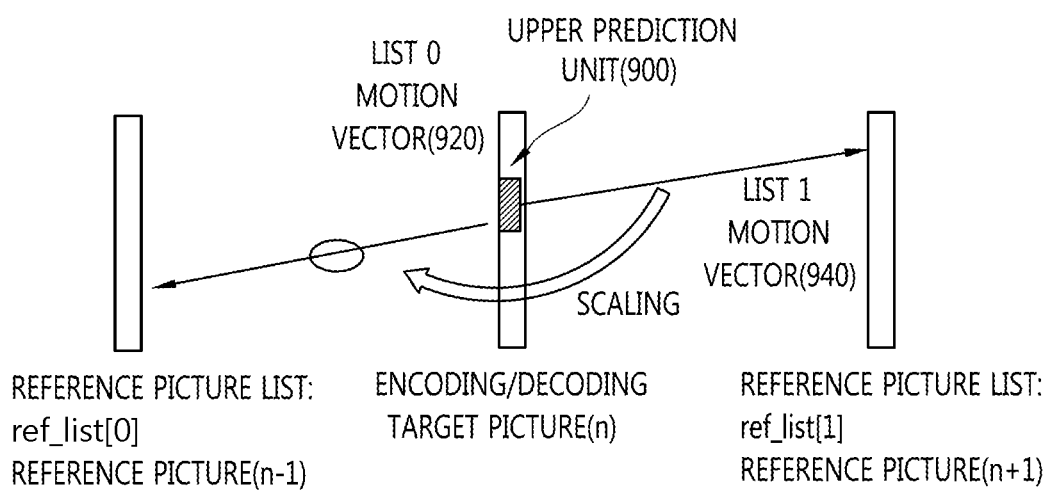
FIG. 9 is a flowchart illustrating a method of producing an additional candidate prediction motion vector according to another embodiment of the present invention.

FIG. 9 is a flowchart illustrating a method of producing an additional candidate prediction motion vector according to another embodiment of the present invention.

FIG. 9 illustrates the method of using scaling among the methods of producing an additional candidate prediction motion vector as described above in connection with step S810.

Referring to FIG. 9, it may be assumed that the spatial candidate prediction block 900 is a prediction block that performs inter prediction based on two motion vectors (a motion vector 920 referring to an n−1th picture included in a reference picture list L0 and a motion vector 940 referring to an n+1th picture included in a reference picture list L1).

Assuming that in producing the candidate prediction motion vector of the prediction target block, among the motion vectors of the upper prediction block, the motion vector 920 referring to the n−1th picture of the reference picture list L0 is removed from the candidate prediction motion vector list to avoid duplication, and only the motion vector 940 referring to the n+1th picture of the remaining reference picture list L1 is used as the candidate prediction motion vector, the motion vector 940, which refers to the reference picture list L1 and is not yet used as the additional candidate prediction motion vector, is subjected to scaling, and the induced motion vector may be used as the additional candidate prediction motion vector.

That is, scaling is performed on the motion vector referring to the n+1th picture in the direction of the reference picture list L1 based on the distance between the reference picture n−1 included in the list L0 of the current prediction block and the n+1th picture in the direction of the reference picture list L1, and a produced motion vector may be included in the candidate prediction motion vector list as the additional candidate prediction motion vector. Such motion vector may be defined by the term "opposite-direction scaling candidate prediction motion vector".

That is, according to an embodiment of the present invention, in case the candidate prediction motion vector is induced from the prediction block referring to ref_list[X], X=0 or 1, the motion vector referring to ref_list[1−X] is subjected to scaling based on the reference picture of the prediction block and may be induced and used as the additional candidate prediction motion vector.

As a method of producing the additional candidate prediction motion vector according to another embodiment of the present invention, an offset-based method may be used.

For example, in case among the candidate prediction motion vectors in the candidate prediction motion vector list, one candidate prediction motion vector is {mvp_x, mvp_y}, offsets α and β, respectively, are added to the X and Y components of the motion vector to thereby induce the additional candidate prediction motion vector {mvp_x+α, mvp_y+β}.

At this time, the offset value may be transmitted on a per-picture basis, per-slice basis, per-LCU (largest coding unit) basis, per-CU basis, or per-PU basis.

The offset value may be produced based on the encoded/decoded motion vector difference (MVD: motion vector difference). Based on a specific picture unit, a higher priority is assigned to the MVD value that occurs most frequently and it may be used as the offset value. A list of MVD values which have priorities in order of most frequent occurrence may be produced, and in case the number of additional candidate prediction motion vectors is two or more, the offset is added to the candidate prediction motion vectors in the candidate prediction motion vector list in order of priority so that new candidate prediction motion vectors may be induced.

A statistical method may be used as the method of producing the additional candidate prediction motion vector according to another embodiment of the present invention.

For example, the motion vectors of the prediction block included in a predetermined slice are arranged in order of frequency of occurrence, and among the arranged motion vectors, at least one vector may be used as the candidate prediction motion vector of the prediction target block. At this time, to reduce complexity, a predetermined limit may be set to restrict the motion vectors, which check whether to occur and frequency, to a predetermined number.

In producing the additional candidate prediction motion vector, as a statistical method according to another embodiment, the candidate prediction motion vector that occurred most frequently in the already encoded and decoded slice may be used as the additional candidate prediction motion vector.

At this time, since upon occurrence of an error, it is impossible to normally refer to the motion vector of the encoded/decoded picture or slice in the encoding/decoding target picture or slice, among the motion vectors that have higher frequency of occurrence, at least one or more may be encoded/decoded in the upper level syntax elements (picture parameter set, adaptive parameter set, slice header, etc.) in the bitstream.

Figure 10:
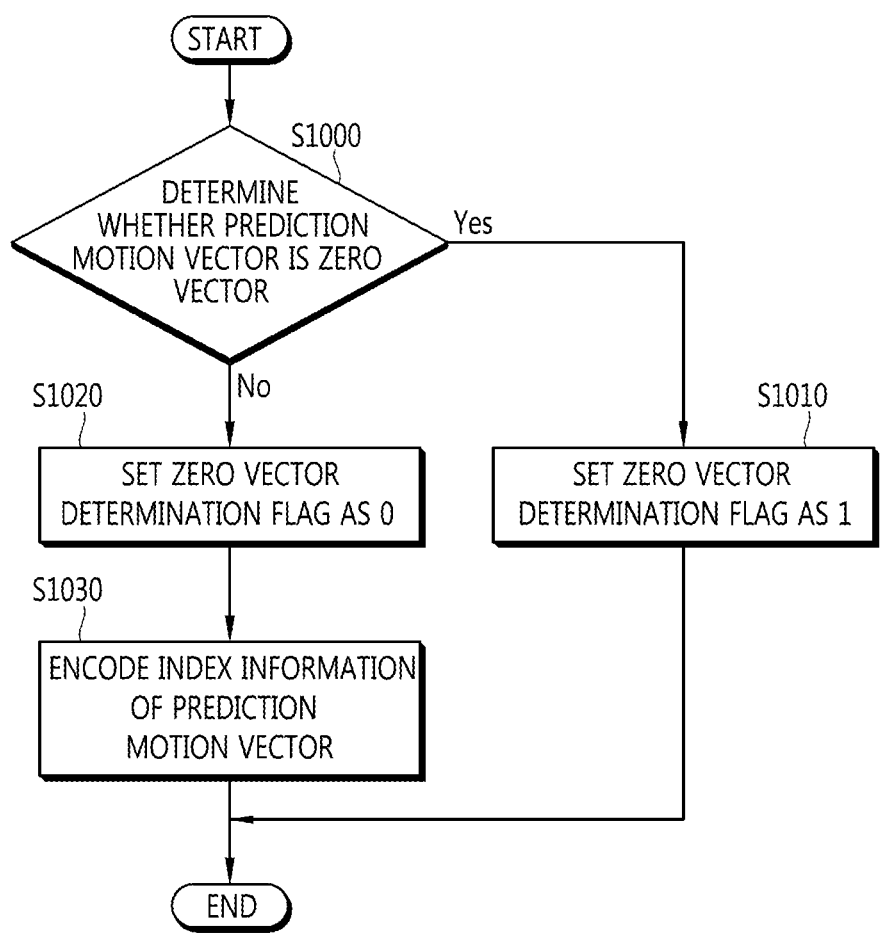
FIG. 10 is a flowchart illustrating a method of producing a prediction motion vector according to an embodiment of the present invention.

FIG. 10 is a flowchart illustrating a method of producing a prediction motion vector according to an embodiment of the present invention.

Hereinafter, the prediction motion vector may be used as the term defining the motion vector selected as the optimal motion vector among the candidate prediction motion vectors.

Referring to FIG. 10, it may be determined whether the prediction motion vector of the prediction target block is a zero vector and may be received through syntax element information. In case information stating that the prediction motion vector is the zero vector is transmitted through the syntax element information, the candidate prediction motion vector list information and index information for determining what candidate prediction motion vector is to be used for the prediction motion vector of the prediction target block are not additionally encoded and decoded, thereby reducing complexity of encoding and decoding processes. At this time, the zero vector means a vector (0, 0) whose x and y components consist of all 0's.

It is determined whether the prediction motion vector is the zero vector (step S1000).

To produce predetermined syntax element information, it is determined whether the prediction motion vector used for the prediction target block is the zero vector.

In case the prediction motion vector is the zero vector, zero vector determination flag (zero_mvp_flag), a syntax element, is set as 1 (step S1010), and unless the prediction motion vector is the zero vector, the zero vector determination flag, which is a syntax element, is set as 0 (step S1020).

The zero vector determination flag (zero_mvp_flag) as a syntax element is an example of a flag which indicates that the prediction motion vector used for the current prediction block is the zero vector. The information stating that the prediction motion vector used for the prediction target block is the zero vector may be represented by other types of syntax element information, not the flag information.

In case the prediction motion vector is not the zero vector, the index information of the prediction motion vector is encoded (step S1030).

In case the prediction motion vector is not the zero vector, the index information may be encoded which is regarding which vector has been used as the prediction motion vector among the candidate prediction motion vectors based on the candidate prediction motion vector list produced using the method of producing the candidate prediction motion vector like the methods described above in connection with FIGS. 3 to 8.

Figure 11:
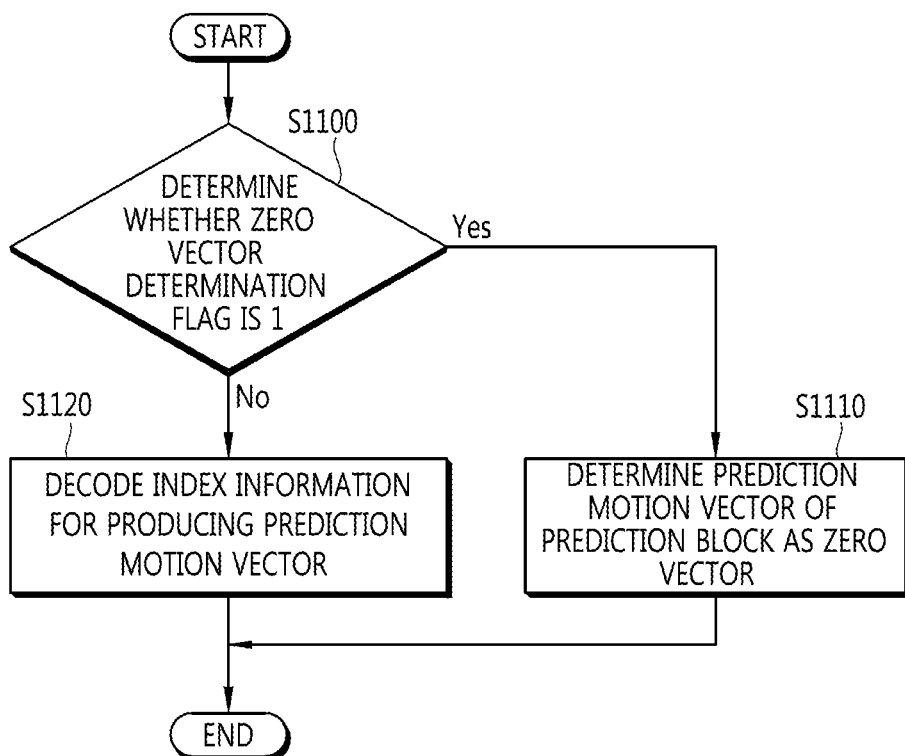
FIG. 11 is a flowchart illustrating a method of producing a prediction motion vector according to another embodiment of the present invention.

FIG. 11 is a flowchart illustrating a method of producing a prediction motion vector according to another embodiment of the present invention.

FIG. 11 discloses a method of decoding based on the method of encoding the prediction motion vector described above in connection with FIG. 10.

Referring to FIG. 11, the zero vector determination flag information is decoded to determine whether the flag value is 1 (step S1100).

As described above, the information stating that the prediction motion vector used for the prediction target block is the zero vector may be represented by syntax element information combined with information other than the flag information or other types of syntax element information. Further, it may be arbitrarily done to determine whether the flag value is 1, and depending on the definition of the flag, it may be also determined whether the flag value is 0.

In case the zero vector determination flag information is 1, the prediction motion vector of the prediction target block is determined as the zero vector (step S1110).

In case the zero vector determination flag information is 0, the index information is decoded to produce the prediction motion vector of the prediction target block (step S1120).

The zero vector determination flag value being 0 and 1 are arbitrarily set to indicate whether the prediction motion vector of the prediction target block is the zero vector.

In case the zero vector determination flag information is 0, the index information of the prediction target block may be decoded to produce the prediction motion vector of the prediction target block.

The prediction motion vector of the current prediction block is determined based on the decoded index information.

Table 1 shows a syntax structure including the zero vector determination flag.

TABLE 1

| | Descriptor |
|---|---|
| prediction_unit(x0, y0, log2PUWidth, log2PUHeight,PartIdx){ | |
| . | |
| . | |
| . | |
|    if(inter_pred_flag[x0][y0]==Pred_LC){ | |
|       if(num_ref_idx_lc_active_minus1>0){ | |
|          if(!entropy_coding_mode_flag){ | |
|            if(combined_inter_pred_ref_idx==MaxPredRef) | |
|               ref_idx_lc_minus4[x0][y0] | ue(v) |
|          }else | |
|             ref_idx_lc[x0][y0] | ae(v) |
|          } | |
|          mvd_lc[x0][y0][0] | se(v)\|ae(v) |
|          mvd_lc[x0][y0][0] | se(v)\|ae(v) |
|          if(!zero_mv_flag) | u(1) |
|          mvp_idx_lc[x0][y0] | ue(v)\|ae(v) |
|    } | |
| . | |
| . | |
| . | |

Referring to Table 1, depending on whether the zero vector determination flag is 1, a process of decoding the index information of the candidate prediction motion vector is performed so that the process of producing the candidate prediction motion vector and the candidate prediction motion vector list may be selectively prevented from being unnecessarily performed during the decoding process.

Figure 12:
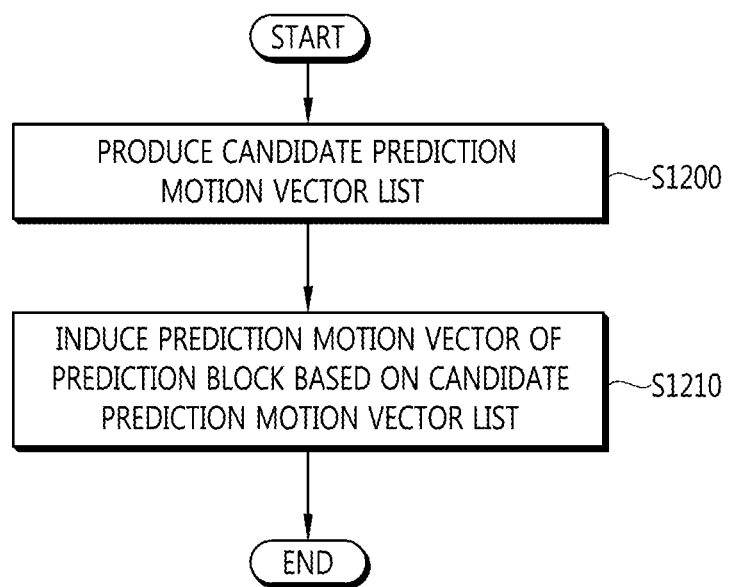
FIG. 12 is a flowchart illustrating a method of producing a prediction motion vector according to an embodiment of the present invention.

FIG. 12 is a flowchart illustrating a method of producing a prediction motion vector according to an embodiment of the present invention.

Referring to FIG. 12, the candidate prediction motion vector list is produced (step S1200).

For example, to produce the candidate prediction motion vector list, like the method described above, the candidate prediction motion vector is produced from the first spatial candidate prediction group, the second spatial candidate prediction group, and temporal candidate prediction block. Assuming that one candidate prediction motion vector is produced for each thereof, the produced candidate prediction motion vectors are included in the candidate prediction motion vector list and may be used to produce the prediction motion vector of the prediction target block. In case the candidate prediction motion vector may include only a predetermined number of candidate prediction motion vectors, if the candidate prediction motion vector list does not include the predetermined number of the candidate prediction motion vectors, additional candidate prediction motion vectors (for example, zero vector, scaling vector, etc.) may be included in the candidate prediction motion vector list. The number of the candidate prediction motion vectors produced from the first spatial candidate prediction group, the second spatial candidate prediction group, and the temporal candidate prediction block is larger than the number of candidate prediction motion vectors that may be included in the candidate prediction motion vector list, some of the produced candidate prediction motion vectors may be removed and then used.

The prediction motion vector of the prediction block is induced from the candidate prediction motion vector list (step S1210).

In the method of producing the candidate prediction motion vector according to an embodiment of the present invention, without using the index information regarding the candidate prediction motion vector, the prediction motion vector may be determined from the candidate prediction motion vector list itself. Since the encoder does not need to transmit the index information regarding the candidate prediction motion vector to the decoder, bits necessary to encode the index information may be saved, thereby enhancing encoding efficiency.

For example, to determine the prediction motion vector in the candidate prediction motion vector list itself, different methods may be used depending on the size of the candidate prediction motion vector list. The size of the candidate prediction motion vector list means the maximum number of candidate prediction motion vectors that may be included in the candidate prediction motion vector list.

In case the size of the candidate prediction motion vector list is 0, the zero vector may be used as the prediction motion vector of the prediction block while the index information to determine the prediction motion vector may not be additionally decoded.

In case the size of the candidate prediction motion vector list is 1, the number of candidate prediction motion vectors present in the candidate prediction motion vector list is 1, and thus, the candidate prediction motion vectors present in the list may be used as the prediction motion vector of the prediction block. Like the situation where the size of the candidate prediction motion vector list is 0, the index information to determine the prediction motion vector may not be additionally decoded.

In case the size of the candidate prediction motion vector list is 2, among the candidate prediction motion vectors included in the candidate prediction motion vector list, the candidate prediction motion vector that has higher frequency of occurrence in the encoding/decoding target slice may be induced as the prediction motion vector to decode the prediction target block. In case a plurality of candidate prediction motion vectors are induced, the candidate prediction motion vectors may be arranged in order of frequency of occurrence, and then, the candidate prediction motion vector having a higher frequency of occurrence may be induced as the prediction motion vector of the prediction block. At this time, to reduce complexity in calculating the frequency of occurrence of the candidate prediction motion vector, such calculation may be performed only on N candidate prediction motion vectors (N is a natural number).

In case the size of the candidate prediction motion vector list is 2, as another embodiment of producing the prediction motion vector, the following Equations 1 and 2 may be used to make comparison on the sum of x-direction and y-direction absolute values of each candidate prediction motion vector so that the candidate prediction motion vector having a smaller sum of the x-direction and y-direction absolute values may be used as the prediction motion vector of the prediction block.

$$|mvp1.x|+|mvp1.y| \qquad \text{<Equation 1>}$$

$$|mvp2.+|+|mvp2.y| \qquad \text{<Equation 2>}$$

In case the size of the candidate prediction motion vector list is 2, as still another embodiment of producing the prediction motion vector, the following Equation 3 may be used.

$$mvp.x=\text{average}(mvp1.x,mvp2.x)$$

$$mvp.y=\text{average}(mvp1.y,mvp2.y) \qquad \text{<Equation 3>}$$

Referring to Equation 3, to extract each component of the prediction motion vector, the x-direction component of the prediction motion vector may be set as the average value of the x-direction components of two candidate prediction motion vectors, and the y-direction component of the prediction motion vector may be set as the average value of the y-direction components of the two candidate prediction motion vectors.

In case the size of the candidate prediction motion vector list is 2, as yet still another embodiment of producing the prediction motion vector, the following Equation 4 may be used.

$$mvp.x=\text{median}(mvp1.x,mvp2.x,0)$$

$$mvp.y=\text{median}(mvp1.y,mvp2.y,0) \qquad \text{<Equation 4>}$$

Referring to Equation 4, to extract each component of the prediction motion vector, the x-direction component of the prediction motion vector may be set as the median value of the zero vector and the x-direction components of two candidate prediction motion vectors, and the y-direction component of the prediction motion vector may be set as the median value of the zero vector and the y-direction components of the two candidate prediction motion vectors.

In case the size of the candidate prediction motion vector list is 2, as yet still another embodiment of producing the prediction motion vector, the following Equation 5 may be used.

$$mvp.x=\text{average}(mvp1.x,mvp2.x,0)$$

$$mvp.y=\text{average}(mvp1.y,mvp2.y,0) \qquad \text{<Equation 5>}$$

Referring to Equation 5, to extract each component of the motion vector, the x-direction component of the prediction motion vector may be set as the average value of the zero vector and the x-direction components of two candidate prediction motion vectors, and the y-direction component of the prediction motion vector may be set as the average of the zero vector and the y-direction components of the two candidate prediction motion vectors.

In case the size of the candidate prediction motion vector list is 2, as yet still another embodiment of producing the prediction motion vector, when the N motion vectors used for calculating the frequency of occurrence that is used in the above-described statistical method are not the same as the two candidate prediction motion vectors in the candidate prediction motion vector list which are subject to calculation of the frequency, based on the index information, the index information that occurs more frequently may be used as the prediction motion vector of the prediction block. For example, in case the candidate prediction motion vector present at index 0 in the previous candidate prediction motion vector list is used as the prediction motion vector, the candidate prediction motion vector present at index 0 may be used as the prediction motion vector.

In case the size of the candidate prediction motion vector list is 3, since the number of the candidate prediction motion vectors present in the candidate prediction motion vector list is 3, one of them may be determined as the prediction motion vector.

The following Equation 6 represents a method of determining the prediction motion vector.

$$mvp.x=\text{median}(mvp1.x,mvp2.x,mvp3.x)$$

$$mvp.y=\text{median}(mvp1.y,mvp2.y,mvp3.y) \qquad \text{<Equation 6>}$$

Referring to Equation 6, to produce the prediction motion vector, among the three candidate prediction motion vectors, the candidate prediction motion vector whose x-direction component corresponds to the median value of the x-direction components of the three candidate prediction motion vectors and the candidate prediction motion vector whose y-direction component corresponds to the median value of the y-direction components of the three candidate prediction motion vectors may be a basis to produce the prediction motion vector of the prediction target block.

In case the size of the candidate prediction motion vector list is 3, as yet still another embodiment of producing the prediction motion vector, the following Equation 7 may be used.

$$mvp.x=\text{average}(mvp1.x,mvp2.x,mvp3.x)$$

$$mvp.y=\text{average}(mvp1.y,mvp2.y,mvp3.y) \qquad \text{<Equation 7>}$$

Referring to Equation 7, to produce the prediction motion vector, among the three candidate prediction motion vectors, the candidate prediction motion vector which corresponds to the average value of the x-direction components of the three candidate prediction motion vectors and the candidate prediction motion vector which corresponds to the average value of the y-direction components of the three candidate prediction motion vectors may be a basis to produce the prediction motion vector of the prediction target block.

Even when three candidate prediction motion vectors are present in the candidate prediction motion vector list, no index information may be used when producing one prediction motion vector in the candidate prediction motion vector list.

Figure 13:
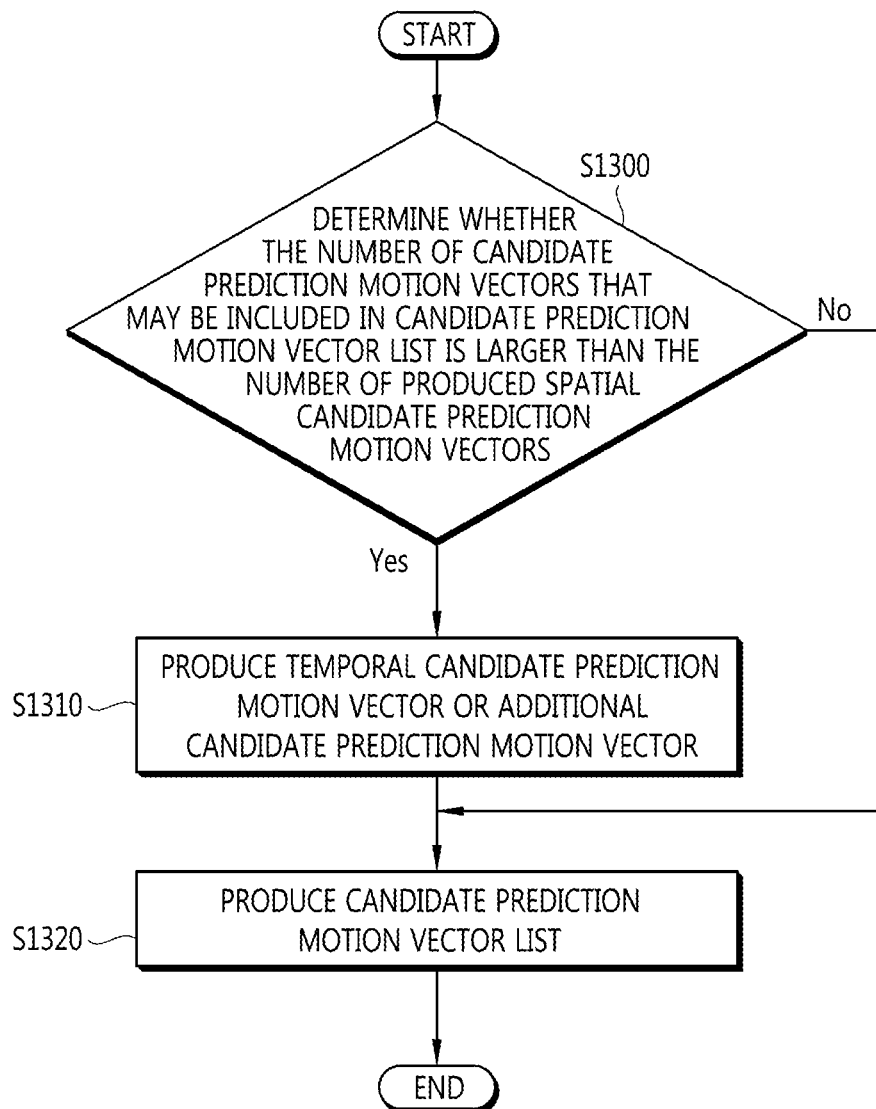
FIG. 13 is a flowchart illustrating a method of producing a prediction motion vector according to another embodiment of the present invention.

FIG. 13 is a flowchart illustrating a method of producing a prediction motion vector according to another embodiment of the present invention.

It may be assumed that the maximum number of candidate prediction motion vectors that may be included in the candidate prediction motion vector list is N, and the spatial candidate prediction motion vector is first induced from the spatial candidate prediction group and the temporal candidate motion vector is induced from the temporal candidate prediction block. According to an embodiment of the present invention, in case the number (N) of the candidate prediction motion vectors induced from the spatial candidate prediction group is the same as the number of candidate prediction motion vectors that may be included in the candidate prediction motion vector list, a process of inducing the candidate prediction motion vector from the temporal candidate prediction block and a process of inducing the additional candidate prediction motion vector may be skipped.

That is, according to an embodiment of the present invention, when the motion vector necessary for the candidate prediction motion vector list has been already produced, no process of inducing unnecessary candidate prediction motion vectors is performed, thereby reducing complexity of the encoding and decoding processes.

Referring to FIG. 13, it is determined whether the number of candidate prediction motion vectors that may be included in the candidate prediction motion vector list is larger than the number of produced spatial candidate prediction motion vectors (step S1300).

The number of candidate prediction motion vectors that may be included in the candidate prediction motion vector list may be restricted. For example, assuming that N prediction motion vectors may be included in the candidate prediction motion vector list, if the number of the spatial candidate prediction motion vectors produced in the spatial candidate prediction group is smaller than N, the temporal prediction motion vector may be produced from the temporal candidate prediction block or additional prediction motion vectors may be produced. Unlike this, assuming that N prediction motion vectors may be included in the candidate prediction motion vector list, if the number of the spatial candidate prediction motion vectors produced in the spatial candidate prediction group is equal to or larger than N, the candidate prediction motion vector list may be produced without producing additional prediction motion vectors or without producing the temporal prediction motion vector from the temporal candidate prediction block (step S1320).

In case the number of the spatial candidate prediction motion vectors produced in the spatial candidate prediction group is smaller than N, the temporal candidate prediction motion vector or additional motion vector is produced (step S1310). At this time, the additional prediction motion vector may be the zero vector.

In case the number of the candidate prediction motion vectors that may be included in the candidate prediction motion vector list is larger than the number of the produced spatial candidate prediction motion vectors through the step of determining whether the number of the candidate prediction motion vectors that may be included in the candidate prediction motion vector list is larger than the number of the produced spatial candidate prediction motion vectors, the candidate prediction motion vector produced through step S1310 of producing the temporal prediction motion vector or additional prediction motion vector may be included in the candidate prediction motion vector list.

The produced spatial candidate prediction motion vector, the temporal candidate prediction motion vector or additional prediction motion vector are used to produce the candidate prediction motion vector list (step S1320).

Figure 14:
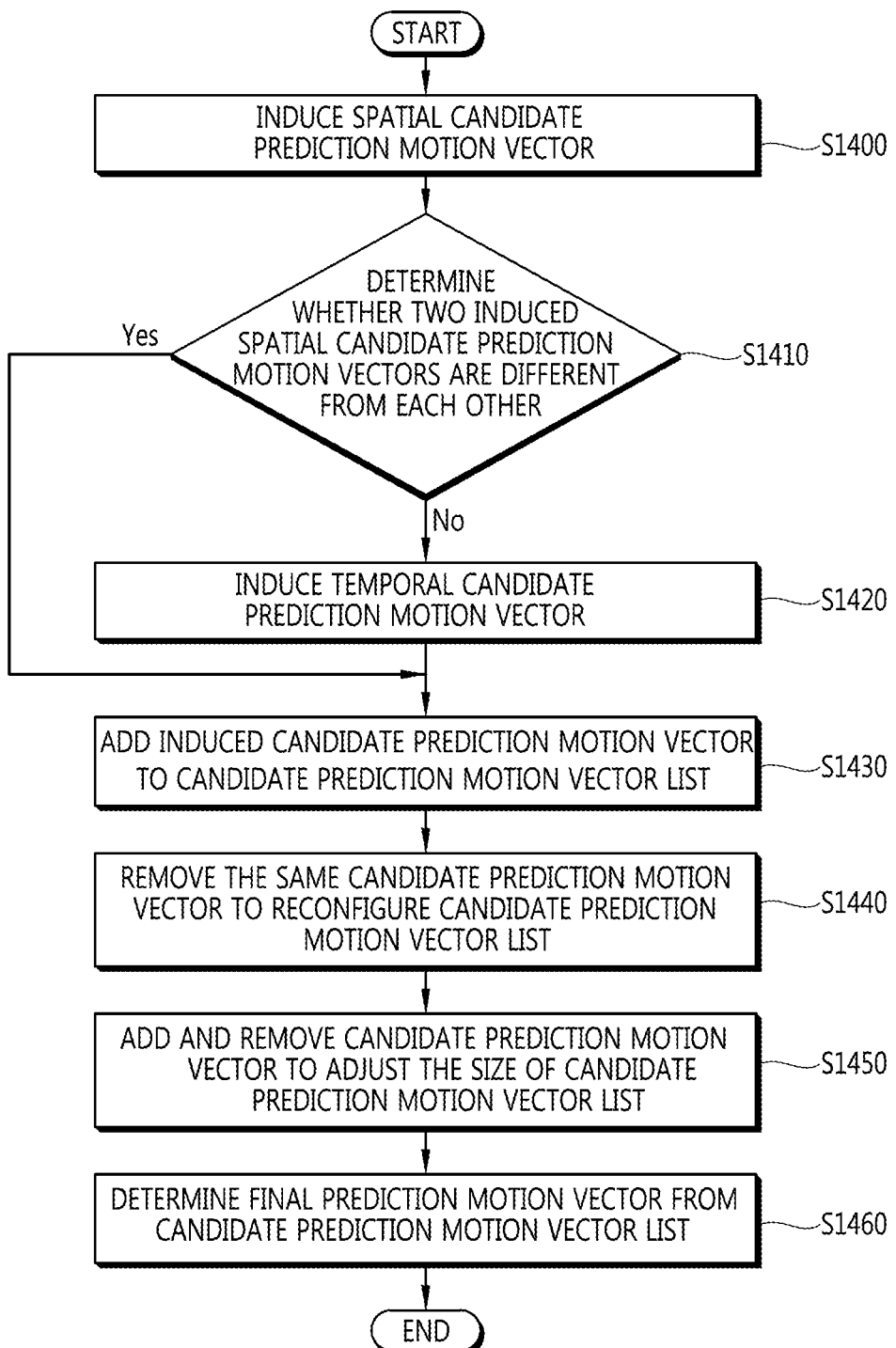
FIG. 14 is a flowchart illustrating a method of producing a candidate prediction motion vector according to an embodiment of the present invention.

FIG. 14 is a flowchart illustrating a method of producing a candidate prediction motion vector according to an embodiment of the present invention.

Referring to FIG. 14, the spatial candidate prediction motion vector is produced (step S1400).

From the encoded/decoded block (or adjacent prediction block) positioned adjacent to the prediction target block, information regarding a plurality of spatial candidate prediction motion vectors may be induced. The information regarding the spatial candidate prediction motion vectors may include at least one of spatial candidate prediction motion vector availability information (availableFlagLXN) and spatial candidate prediction motion vector (mvLXN). That is, the unit of information including all of the spatial candidate prediction motion vector availability information and the spatial candidate prediction motion vector may be referred to as the spatial candidate prediction motion vector related information, or one of the spatial candidate prediction motion vector availability information and the spatial candidate prediction motion vector may be referred to as the spatial candidate prediction motion vector related information.

For example, as shown in FIG. 3, from B1 which is a block adjacent to the upper end of the prediction target block X, A1 which is a block adjacent to the left side of the prediction target block, B0 which is a block positioned at the upper and right corner of the prediction target block, B2 which is a block positioned at the upper and left corner of the prediction target block, and A0 which is a block positioned at the lower and left corner of the prediction target block, the spatial candidate prediction motion vector may be induced and may be determined as the spatial candidate prediction motion vector for the prediction target block. From the blocks A0, A1, B0, B1, and B2 (hereinafter, referred to as "spatial candidate prediction blocks"), up to two spatial candidate prediction motion vectors may be produced with respect to the encoding/decoding target block. Hereinafter, the blocks A0, A1, B0, B1, and B2 are referred to as the spatial candidate prediction blocks, while the blocks A0 and A1 may be classified into a first spatial candidate prediction block group, and the blocks B0, B1, and B2 may be classified into a second spatial candidate prediction block group.

These spatial candidate prediction block groups are merely an example. The spatial candidate prediction block group may be created to consist of the blocks located at other positions, which is also included in the scope of the present invention. Hereinafter, according to an embodiment of the present invention, for ease of description, the spatial candidate prediction block groups are assumed to consist of the blocks located at the above-described positions.

In case the spatial candidate prediction motion vector is induced from the spatial candidate prediction block, availableFlagLXY is set as 1, and otherwise, as 0. In 'availableFlagLXY', 'X' represents which one of the reference picture lists L0 and L1 the prediction target block refers to, and LX may be replaced by L0 or L1. Further, in 'availableFlagLXY', 'Y' refers to the position in which the spatial candidate prediction motion vector is induced. As shown in FIG. 2, if the spatial candidate prediction motion vector is induced from the block positioned at A0 or A1, Y may be A, and if the spatial candidate prediction motion vector is induced from the blocks positioned at B0, B1, or B2, Y may be B. At this time, the reference picture list means a list including reference pictures used for inter prediction or motion compensation. The type of the reference picture list may include LC (List Combined), L0 (List 0), or L1 (List 1). The reference picture means an picture to which a specific block refer for inter prediction or motion compensation.

For example, one spatial candidate prediction motion vector may be induced from the block positioned at A0 or A1, and one spatial candidate prediction motion vector may be induced from the block positioned at B0, B1, or B2. At this time, if the prediction target block refers to the reference picture list L0, and one spatial candidate prediction motion vector is induced from the block positioned at A0 and one spatial candidate prediction motion vector is induced from the block positioned at B1, availableFlagL0A is set as 1, and availableFlagL0B is set as 1. That is, in case the prediction target block refers to the reference picture list LX, availableFlagLXY refers to whether there is a spatial candidate prediction motion vector induced from a block located at a predetermined position.

Referring back to FIG. 4, the spatial candidate prediction motion vectors that may be induced may be classified into four motion vectors as follows:

(1) First motion vector: in case a block is available at a predetermined position, the corresponding block is not subjected to intra encoding, and the reference picture list and the reference picture of the corresponding block are the same as the reference picture list and the reference picture of the encoding/decoding target block, a candidate prediction motion vector induced from the corresponding block.

(2) second motion vector: in case a block is available at a predetermined position, the corresponding block is not subjected to intra encoding, and the reference picture list of the corresponding block is different from the reference picture list of the encoding/decoding target block while the corresponding block and the encoding/decoding target block refer to the same reference picture, a candidate prediction motion vector induced from the corresponding block.

(3) third motion vector: in case a block is available at a predetermined position, the corresponding block is not subjected to intra encoding, and the reference picture list of the corresponding block is the same as the reference picture list of the encoding/decoding target block while the reference picture of the corresponding block is different from the reference picture of the encoding/decoding target block, a candidate prediction motion vector produced by performing scaling on the motion vector of the corresponding block.

(4) fourth motion vector: in case a block is available at a predetermined position, the corresponding block is not subjected to intra encoding, and the reference picture list and reference picture of the corresponding block are different from the reference picture list and reference picture of the encoding/decoding target block, a candidate prediction motion vector produced by performing scaling on the motion vector of the corresponding block.

It may be determined in the following order whether the above-classified four spatial candidate prediction motion vectors are available in the spatial candidate prediction block.

(1) First spatial candidate prediction block group
1) it is determined whether there is the first motion vector or the second motion vector in block A0.
2) it is determined whether there is the first motion vector or the second motion vector in block A1.
3) it is determined whether there is the third motion vector or the fourth motion vector in block A0.
4) it is determined whether there is the third motion vector or the fourth motion vector in block A1.

The above steps 1) to 4) may be sequentially performed to determine whether there is a spatial candidate prediction motion vector satisfying the condition in the corresponding block, and in case there is a spatial candidate prediction motion vector satisfying the condition, the corresponding motion vector is induced while the step is not performed. For example, in case there is a spatial candidate prediction motion vector satisfying the step 1), steps 2) to 4) may be skipped.

In case the spatial candidate prediction motion vector satisfying the condition through the steps 3) and 4) is the third motion vector or the fourth motion vector, the spatial candidate prediction motion vector may be produced through scaling. In such case, flag information indicating whether to perform scaling may be used to indicate that scaling has been used. Or, in case block A0 is available and block A0 does not use the intra prediction mode or in case block A1 is available and block A1 does not use the intra prediction mode, the flag indicating whether to perform scaling is set as 1, and in case no spatial candidate prediction motion vector may be produced from the first spatial candidate prediction block group as if blocks A0 and A1 are not available or intra prediction is used, the flag indicating whether to perform scaling is set as 0 so that two spatial candidate prediction motion vectors may be produced from the second spatial candidate prediction block group. Hereinafter, according to an embodiment of the present invention, for ease of description, it is assumed that the first spatial candidate prediction motion vector is produced from the first spatial candidate prediction block group, and the second spatial candidate prediction motion vector is produced from the second spatial candidate prediction block group.

What follows is an order in which the spatial candidate prediction motion vector is produced from the second spatial candidate prediction block group:

(2) Second spatial candidate prediction block group
1) it is determined whether there is the first motion vector or the second motion vector in block B0.
2) it is determined whether there is the first motion vector or the second motion vector in block B1.
3) it is determined whether there is the first motion vector or the second motion vector in block B2.
4) it is determined whether there is the third motion vector or the fourth motion vector in block B0.
5) it is determined whether there is the third motion vector or the fourth motion vector in block B1.
6) it is determined whether there is the third motion vector or the fourth motion vector in block B2.

Like when producing the first spatial candidate prediction motion vector, the steps 1) to 6) are sequentially performed to determine whether there is a spatial candidate prediction motion vector satisfying the condition in the corresponding block, and in case there is a spatial candidate prediction motion vector satisfying the condition, the corresponding motion vector is induced and the following steps may be skipped.

Further, up to N spatial candidate prediction motion vectors may be induced. At this time, N may be a positive integer, for example, 2.

It is determined whether the induced two spatial candidate prediction motion vectors are different from each other (step S1410).

According to an embodiment of the present invention, based on the spatial candidate prediction motion vector related information, the temporal candidate prediction motion vector related information (for example, at least one of temporal candidate prediction motion vector availability information and temporal candidate prediction motion vector) may be determined. That is, based on the spatial candidate prediction motion vector related information induced in step S1400, it may be determined whether to induce the temporal candidate prediction motion vector.

To determine whether the induced two spatial candidate prediction motion vectors are different from each other, it is determined whether two spatial candidate prediction motion vectors may be induced, and to determine whether, in case two spatial candidate prediction motion vectors are induced, the induced spatial candidate prediction motion vectors are different from each other, it is determined whether availableFlagLXA and availableFlagLXB are both 1, and whether mvLXA is the same as mvLXB or not. availableFlagLXA is a flag indicating whether the first spatial candidate prediction motion vector may be produced from the first spatial candidate prediction group, and availableFlagLXB is a flag indicating whether the second spatial candidate prediction motion vector may be produced from the second spatial candidate prediction group. For example, in case the first spatial candidate prediction motion vector may be produced from the first spatial candidate prediction group, availableFlagLXA may be set as 1. mvLXA is the first spatial candidate prediction motion vector and may be produced when availableFlagLXA is available, and mvLXB is the second spatial candidate prediction motion vector and may be produced when availableFlagLXB is available.

Hereinafter, according to an embodiment of the present invention, availableFlagLXA may be defined as the first spatial candidate prediction motion vector availability information, and availableFlagLXB may be defined as the second spatial candidate prediction motion vector availability information. Further, mvLXA may be defined as the first spatial candidate prediction motion vector, and mvLXB may be defined as the second spatial candidate prediction motion vector.

If it is assumed that availableFlagLXA and availableFlagLXB are both 1, mvLXA and mvLXB are not the same as each other, and the maximum number of candidate prediction motion vectors that may be included in the candidate prediction motion vector list is 2, the candidate prediction motion vector list may consist of the spatial candidate prediction motion vectors, and thus no additional candidate prediction motion vector needs to be induced. Accordingly, it is not required to induce the temporal candidate prediction motion vector which is the candidate prediction motion vector induced from the collocated block (temporal candidate prediction block). Thus, availableFlagLXCol, which is flag information indicating whether the temporal candidate prediction motion vector is available, is set as 0, and the candidate prediction motion vector list is produced only from the spatial candidate prediction motion vectors induced as in step S1430 to be described below. That is, since the temporal candidate prediction motion vector is not induced, complexity may be reduced during the process of inducing the candidate prediction motion vector.

That is, the temporal candidate prediction motion vector related information may be determined based on the spatial candidate prediction motion vector related information.

In case availableFlagLXA and availableFlagLXB are both 1, it may be possible to selectively determine whether mvLXA is the same as mvLXB. For example, two determination conditions may be used to perform 1) step of determining whether availableFlagLXA and availableFlagLXB are both 1 and 2) step of, in case availableFlagLXA and availableFlagLXB are both 1, determining whether mvLXA is the same as mvLXB.

In case two spatial candidate prediction motion vectors are not induced or induced two candidate prediction motion vectors are the same as each other, the temporal candidate prediction motion vector is produced from the collocated block (step S1420).

That is, in step S1420, the temporal candidate prediction motion vector related information may be determined based on the spatial candidate prediction motion vector related information.

In case neither availableFlagLXA nor availableFlagLXB is 1 or in case mvLXA is the same as mvLXB, the temporal candidate prediction motion vector is produced from the collocated block.

If it is assumed that two candidate prediction motion vectors need to be included in the candidate prediction motion vector list, in case neither availableFlagLXA nor availableFlagLXB is 1 or mvLXA is the same as mvLXB, two candidate prediction motion vectors are not included in the candidate prediction motion vector list, and thus, the temporal candidate prediction motion vector needs to be produced from the collocated block.

The following Tables 2 and 3 represent whether to perform the process of inducing the temporal candidate prediction motion vector depending on the result of inducing the spatial candidate prediction motion vector.

TABLE 2

| Cases | 1 | 2 |
|---|---|---|
| Whether to induce spatial motion vector | Induce only one | Induce two |
| availableFlagLXY value after step of inducing spatial candidate prediction motion vector is performed | In case availableFlagLXA is 1 and availableFlagLXB is 0 or In case availableFlagLXA is 0 and availableFlagLXB is 1 | In case availableFlagLXA is 1 and availableFlagLXB is 1 |
| Whether spatial motion vectors are the same | — | Yes |
| Whether to perform process of inducing temporal motion vector | Yes | Yes |
| availableFlagLXCol value after step of inducing temporal candidate prediction motion vector is performed | If temporal motion vector is induced, availableFlagLXCol is set as 1, otherwise availableFlagLXCol is set as 0 | If temporal motion vector is induced, availableFlagLXCol is set as 1, otherwise availableFlagLXCol is set as 0 |

TABLE 3

| Cases | 3 | 4 |
|---|---|---|
| Whether to induce spatial motion vector | Induce two | No |
| availableFlagLXY value after step of inducing spatial candidate prediction motion vector is performed | In case availableFlagLXA is 1 and availableFlagLXB is 1 | In case availableFlagLXA is 0 and availableFlagLXB is 0 |
| Whether spatial motion vectors are the same | No | — |
| Whether to perform process of inducing temporal motion vector | No | Yes |
| availableFlagLXCol value after step of inducing temporal candidate prediction motion vector is performed | availableFlagLXCol is set as 0 | If temporal motion vector is induced, availableFlagLXCol is set as 1, otherwise availableFlagLXCol is set as 0 |

Referring to Tables 2 and 3, in case the spatial candidate prediction motion vector is produced, depending on availableFlagLXY indicating whether the spatial candidate prediction motion vector is available and depending on whether the induced spatial candidate prediction motion vectors are the same, there may be four steps of inducing the temporal candidate prediction motion vector. Hereinafter, with respect to the four cases depending on availableFlagLXY of the spatial candidate prediction motion vector, it is described to induce the temporal candidate prediction motion vector.

(1) Case that one spatial candidate prediction motion vector is induced. This is when availableFlagLXA is 1 and availableFlagLXB is 0 or when availableFlagLXA is 0 and availableFlagLXB is 1. In the first case, one spatial candidate prediction motion vector only is induced, and thus, it cannot be possible to determine whether the spatial candidate prediction motion vectors are the same. In case the number of candidate prediction motion vectors that may be included in the candidate prediction motion vector list is 2, the step of inducing the temporal candidate prediction motion vector is performed to produce the additional candidate prediction motion vector. If the temporal candidate prediction motion vector is induced, availableFlagLXCol is set as 1, and otherwise, availableFlagLXCol is set as 0.

(2) Case that two candidate prediction motion vectors are induced. This is when availableFlagLXA and availableFlagLXB are 1. If the induced spatial candidate prediction motion vectors have the same value, one of the same spatial candidate prediction motion vectors is removed. Since one candidate prediction motion vector remains, in case the number of candidate prediction motion vectors that may be included in the candidate prediction motion vector list is 2, the step of inducing the temporal candidate prediction motion vector is performed to produce the additional candidate prediction motion vector. In case the temporal candidate prediction motion vector is induced, availableFlagLXCol is set as 1, and unless the temporal candidate prediction motion vector is induced, availableFlagLXCol may be set as 0.

(3) Case that two spatial candidate prediction motion vectors are induced. This is when availableFlagLXA and availableFlagLXB are 1. If the induced spatial candidate prediction motion vectors do not have the same value, in case the number of candidate prediction motion vectors that may be included in the candidate prediction motion vector list is 2, the step of inducing the temporal candidate prediction motion vector need not be performed to produce the additional candidate prediction motion vector, and availableFlagLXCol indicating the availability of the temporal candidate prediction motion vector is set as 0. At this time, if availableFlagLXCol, which is availability information of the temporal candidate prediction motion vector, is a predetermined value, '0', then this means that no temporal candidate prediction motion vector is induced or that the temporal candidate prediction motion vector is not available.

(4) Case that two spatial candidate prediction motion vectors are not induced. This is when availableFlagLXA and availableFlagLXB are 0. In such case, the process of inducing the temporal candidate prediction motion vector is performed to produce the temporal candidate prediction motion vector.

That is, in case the maximum number of candidate prediction motion vectors that may be included in the candidate prediction motion vector list is 2, two types of spatial candidate prediction motion vector availability information (availableFlagLXA, availableFlagLXB) are both 1, and the produced two spatial candidate prediction motion vectors are not the same as each other, the temporal candidate prediction motion vector is not produced.

In the above-described embodiment of the present invention, as the spatial candidate prediction motion vector related information, the spatial candidate prediction motion vector availability information and the spatial candidate prediction motion vector are all used to induce the temporal candidate prediction motion vector related information. However, based on at least one of the spatial candidate prediction motion vector availability information and spatial candidate prediction motion vector, it may be used to induce the temporal candidate prediction motion vector related information as the spatial candidate prediction motion vector related information.

For example, in case the spatial candidate prediction motion vectors are induced, and the two induced spatial candidate prediction motion vectors have different values, the temporal candidate prediction motion vector related information may be induced without determining what value the spatial candidate prediction motion vector availability information has.

Hereinafter, a method of producing a temporal candidate prediction motion vector is described.

Figure 15:
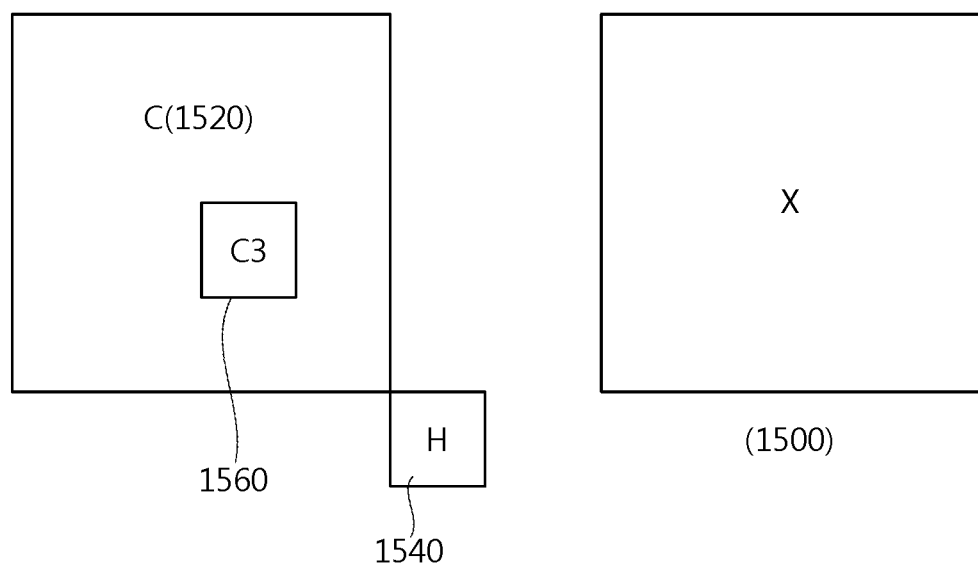
FIG. 15 is a conceptual view illustrating a method of producing a temporal candidate prediction motion vector according to an embodiment of the present invention.

FIG. 15 is a conceptual view illustrating a method of producing a temporal candidate prediction motion vector according to an embodiment of the present invention.

Referring to FIG. 15, a temporal candidate prediction motion vector may be produced from a collocated block 1520 present in a collocated picture of a prediction target block 1500.

In case a point position at a left and upper end of the prediction target block is (xP, yP), the width of the prediction target block is nPSW, and the height of the prediction target block is nPSH, a first collocated block 1540 may be a block including a point (xP+nPSW, yP+nPSH) positioned in the collocated picture, and a second collocated block 1560 may be a block including a point (xP+(nPSW>>1), yP+(nPSH>>1)) positioned in the collocated picture. In case the temporal candidate prediction motion vector is not induced from the first collocated block (for example, in case the first collocated block is subjected to intra prediction encoding), the temporal candidate prediction motion vector may be induced from the second collocated block. The number of the produced temporal candidate prediction motion vectors may be restricted. For example, in case maximally one temporal candidate prediction motion vector only is restricted to be produced, if the temporal candidate prediction motion vector is produced from the first collocated block, no temporal candidate prediction motion vector may be produced from the second collocated block. In case of the temporal candidate prediction motion vector, the temporal candidate prediction motion vector value may be scaled based on a relationship of a distance between the picture including the prediction target block and the reference picture of the prediction target block and a distance between the picture including the collocated block and the reference picture of the collocated block.

Depending on whether the temporal candidate prediction motion vector has been induced, availableFlagLXCol is determined. In 'availableFlagLXCol', 'X' refers to which one of the reference picture lists L0 and L1 the encoding/decoding target block has referred. LX may be replaced by L0 or L1. In case the temporal candidate prediction motion vector is induced, availableFlagLXCol is set as 1, and in case the temporal candidate prediction motion vector is not induced, availableFlagLXCol is set as 0.

For example, if the encoding/decoding target block refers to the reference picture list L0 and the temporal candidate prediction motion vector is induced from the block positioned at H of FIG. 15, availableFlagL0Col is set as 1, and if no temporal candidate prediction motion vector is induced, availableFlagL0Col is set as 0.

The induced candidate prediction motion vector is added to the candidate prediction motion vector list (step S1430).

The induced spatial candidate prediction motion vector and temporal candidate prediction motion vector are added to the candidate prediction motion vector list in order of being induced. For example, the candidate prediction motion vector list may add the candidate prediction motion vector depending on the values of availableFlagLXA, availableFlagLXB, and availableFlagLXCol. For example, in case availableFlagLXA is 1, availableFlagLXB is 0, and availableFlagLXCol is 1, one spatial candidate prediction motion vector mvLXA and one temporal candidate prediction motion vector mvLXCol are added to the candidate prediction motion vector list. As another example, in case availableFlagLXA is 1, availableFlagLXB is 1, and availableFlagLXCol is 0, two spatial candidate prediction motion vectors mvLXA and mvLXB are added to the candidate prediction motion vector list.

As still another example, in case the spatial candidate prediction motion vector or temporal candidate prediction motion vector is induced without determining the spatial candidate prediction motion vector availability information or temporal candidate prediction motion vector availability information, the vector may be immediately added to the candidate prediction motion vector list.

The size of the candidate prediction motion vector list may be limited to a predetermined size. For example, the predetermined size may be 3. The first candidate prediction motion vector added to the candidate prediction motion vector list may have an index value of 0, and the last candidate prediction motion vector added to the candidate prediction motion vector list may have an index value of 2.

That is, it is determined whether the number of candidate prediction motion vectors included in the candidate prediction motion vector list is smaller than the maximum number of the candidate prediction motion vectors that may be included in the candidate prediction motion vector list. Based on a result of the determination, the candidate prediction motion vector may be added or removed from the candidate prediction motion vector list.

For example, in case the number of the candidate prediction motion vectors included in the candidate prediction motion vector list is smaller than the maximum number of the candidate prediction motion vectors, a zero vector may be added to the candidate prediction motion vector list. Further, in case the number of the candidate prediction motion vectors included in the candidate prediction motion vector list is equal to or larger than the maximum number of the candidate prediction motion vectors, some of the candidate prediction motion vectors may be removed from the candidate prediction motion vector list so that as many candidate prediction motion vectors as the maximum number may be included in the candidate prediction motion vector list.

Figure 16:
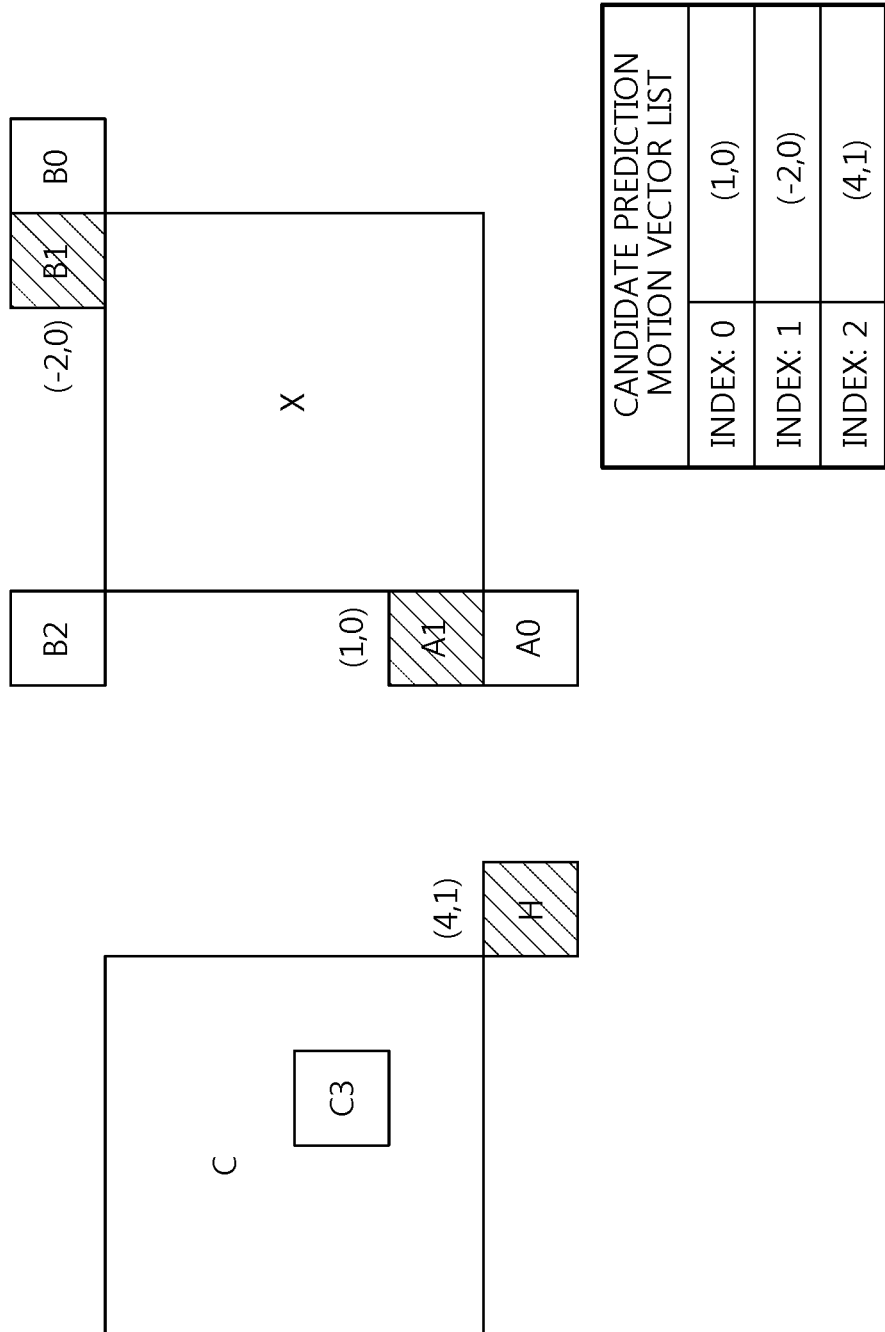
FIG. 16 is a conceptual view illustrating a method of producing a candidate prediction motion vector list according to an embodiment of the present invention.

FIG. 16 is a conceptual view illustrating a method of producing a candidate prediction motion vector list according to an embodiment of the present invention.

Referring to FIG. 16, if a non-scaled spatial candidate prediction motion vector (1, 0) is induced from block A1, a scaled spatial candidate prediction motion vector (−2, 0) is induced from block B1, and a scaled temporal candidate prediction motion vector (4, 1) is induced from block H, the induced candidate prediction motion vectors are added to the candidate prediction motion vector list in order of being induced as in the left table. At this time, the index value of the candidate prediction motion vector induced from the block positioned at A1 may be 0, the index value of the candidate prediction motion vector induced from the block positioned at B1 may be 1, and the index value of the candidate prediction motion vector induced from the block positioned at H may be 2.

If as in the third case of Table 3 the size of the candidate prediction motion vector list is 2, the number of the induced spatial candidate prediction motion vectors is 2, and the two spatial candidate prediction motion vectors are different from each other, since the size of the candidate prediction motion vector list is 2, without the need of separately inducing the temporal candidate prediction motion vector, indexes are sequentially assigned to the induced spatial candidate prediction motion vectors, thereby configuring the candidate prediction motion vector list.

The same candidate prediction motion vectors are removed to thereby re-configure the candidate prediction motion vector list (step S1440).

It is determined whether there are the same candidate prediction motion vectors among the spatial candidate prediction motion vectors and the temporal candidate prediction motion vectors included in the candidate prediction motion vector list, and if there is any, one of the same candidate prediction motion vectors is removed, thereby reconfiguring the candidate prediction motion vector list.

For example, in case the first spatial candidate prediction motion vector and the second spatial candidate prediction motion vector, which constitute the candidate prediction motion vector list, are the same as each other, the second spatial candidate prediction motion vector may be removed from the candidate prediction motion vector list.

Figure 17:
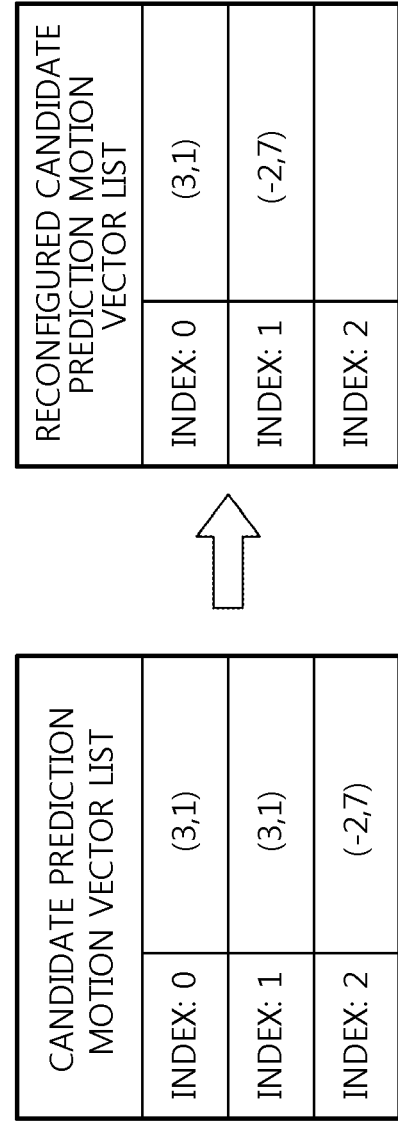
FIG. 17 is a conceptual view illustrating removing the same candidate prediction motion vector from the candidate prediction motion vector list according to an embodiment of the present invention.

FIG. 17 is a conceptual view illustrating removing the same candidate prediction motion vector from the candidate prediction motion vector list according to an embodiment of the present invention.

Referring to FIG. 17, in case the candidate prediction motion vectors whose index is 0 and 1, which are included in the candidate prediction motion vector list, are the same as each other, the candidate prediction motion vector having the smaller index value is left while the other candidate prediction motion vector having the same value may be removed. The index value of the candidate prediction motion vector, which is larger than the index value of the removed candidate prediction motion vector, is changed by the number of the removed candidate prediction motion vectors.

A candidate prediction motion vector is added and removed, thereby readjusting the size of the candidate prediction motion vector list (step S1450).

By adding or removing a candidate prediction motion vector to/from the candidate prediction motion vector list, the size of the candidate prediction motion vector list may be adjusted. In case P is the number of candidate prediction motion vectors included in the candidate prediction motion vector list, and Q is the size of the final candidate prediction motion vector list, if P is smaller than Q, a candidate prediction motion vector may be added to the candidate prediction motion vector list while if P is larger than Q, a candidate prediction motion vector may be removed from the candidate prediction motion vector list so that P is equal to Q.

Figure 18:
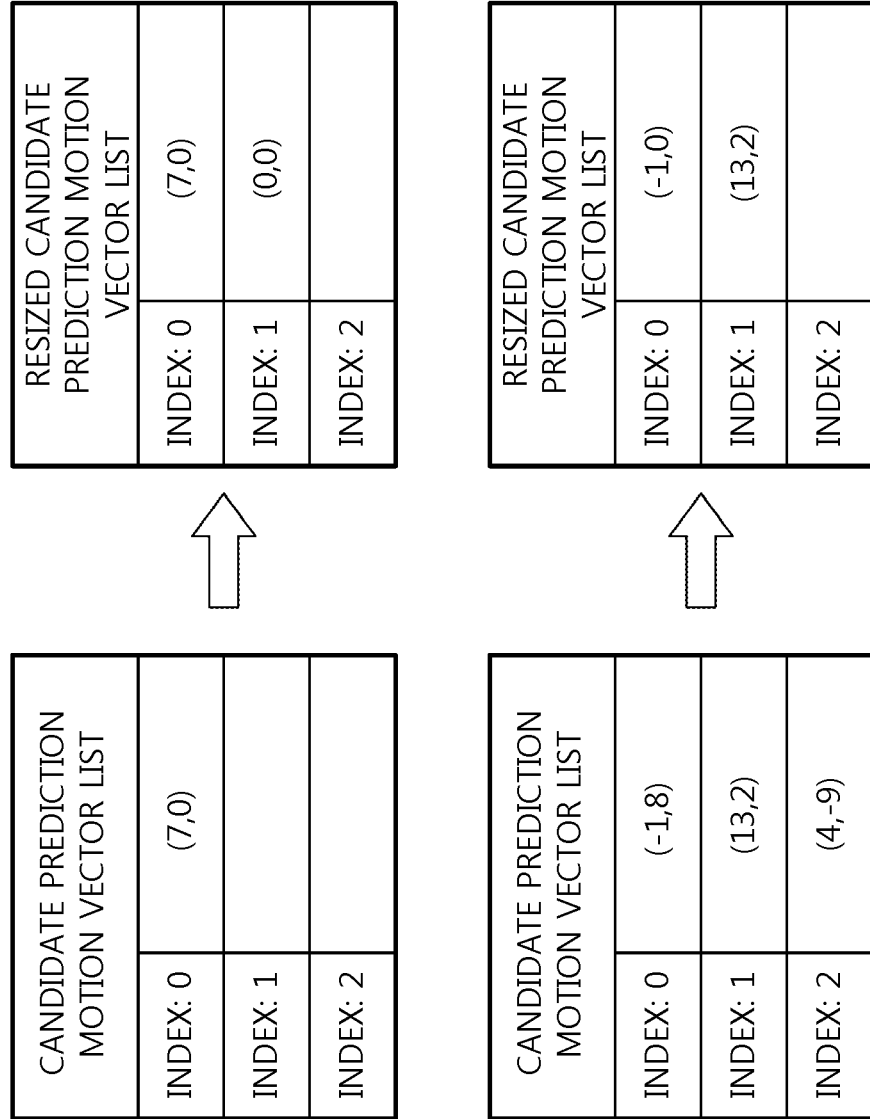
FIG. 18 is a conceptual view illustrating a method of adjusting the size of the candidate prediction motion vector list by adding or removing the candidate prediction motion vector according to an embodiment of the present invention.

FIG. 18 is a conceptual view illustrating a method of adjusting the size of the candidate prediction motion vector list by adding or removing the candidate prediction motion vector according to an embodiment of the present invention.

For example, assume that the size of the candidate prediction motion vector list is 2. Referring to the upper part of FIG. 18, since one candidate prediction motion vector is included in the candidate prediction motion vector list, a zero vector (0, 0) is added to the candidate prediction motion vector list, thereby configuring the candidate prediction motion vector list.

Referring to the lower part of FIG. 18, since three candidate prediction motion vectors are included in the candidate prediction motion vector list, one candidate prediction motion vector having the largest index value in the candidate prediction motion vector list may be removed, thereby configuring the candidate prediction motion vector list.

The final prediction motion vectors are determined from the candidate prediction motion vector list (step S1460).

Based on the candidate prediction motion vector list produced through step S1400 to step S1460 and the index information of the final prediction motion vector transmitted from the encoder, the final prediction motion vector to be used for motion compensation is determined.

Figure 19:
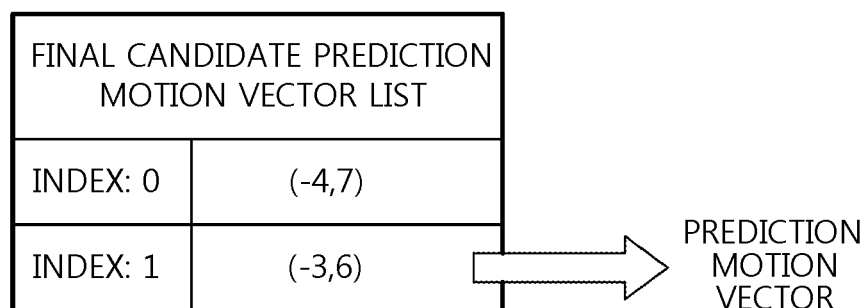
FIG. 19 is a conceptual view illustrating determining the final prediction motion vector in the candidate prediction motion vector list according to an embodiment of the present invention.

FIG. 19 is a conceptual view illustrating determining the final prediction motion vector in the candidate prediction motion vector list according to an embodiment of the present invention.

Referring to FIG. 19, in case the encoder transmits information stating that the candidate prediction motion vector corresponding to index 1 has been used as the final prediction motion vector, the candidate prediction motion vector corresponding to index 1, for example, (−3, 6), in the produced candidate prediction motion vector list may be determined as the final prediction motion vector.

Figure 20:
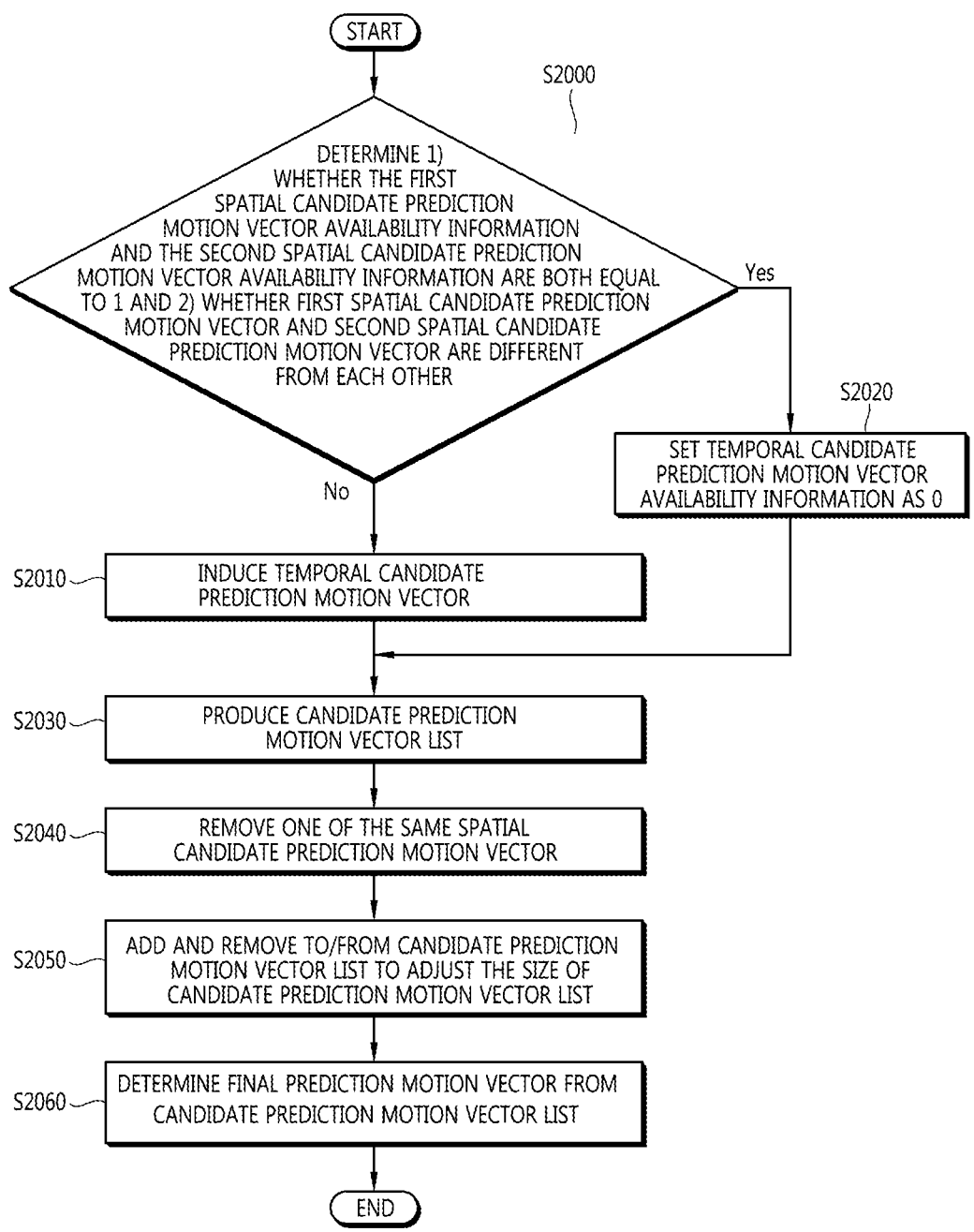
FIG. 20 is a flowchart illustrating a method of producing a candidate prediction motion vector list according to an embodiment of the present invention.

FIG. 20 is a flowchart illustrating a method of producing a candidate prediction motion vector list according to an embodiment of the present invention.

FIG. 20 summarizes the methods of producing the candidate prediction motion vector list without inducing the temporal candidate prediction motion vector in case the induced spatial candidate prediction motion vectors are different from each other and with inducing the temporal candidate prediction motion vector in case the spatial candidate prediction motion vectors are the same as each other as described in case of above in connection with FIGS. 14 to 19.

1) whether both the first spatial candidate prediction motion vector availability information indicating whether there is a spatial candidate prediction motion vector in the first spatial candidate prediction block group (A0, A1) and the second spatial candidate prediction motion vector availability information indicating whether there is a spatial candidate prediction motion vector in the second spatial candidate prediction block group (B0, B1, B2) are available; and
2) whether the first spatial candidate prediction motion vector induced from the first spatial candidate prediction group is different from the second spatial candidate prediction motion vector induced from the second spatial candidate prediction group are determined (step S2000).

Identical to the above-described step S1410, step S2000 may induce the spatial candidate prediction motion vectors based on the availability information and may determine whether two induced spatial candidate prediction motion vectors are different from each other.

The availability information of the first spatial candidate prediction motion vector may be produced through the following steps.

The first motion vector to the fourth motion vector are defined as described above in connection with FIG. 4.
(1) Step of determining whether there is the first motion vector in the first block A0 or the second block A1 included in the first spatial candidate prediction block group,
(2) Step of determining whether there is the second motion vector in the first block A0 and the second block A1 of the first spatial candidate prediction block group in case there is no first motion vector in the first block A0 or the second block A1 included in the first spatial candidate prediction block group,
(3) Step of determining whether there is the third motion vector in the first block A0 and the second block A1 of the first spatial candidate prediction block group in case the first motion vector or the second motion vector is not available in the first block A0 or the second block A1 included in the first spatial candidate prediction block group, (4) Step of determining whether there is the fourth motion vector in the first block A0 and the second block A1 of the first spatial candidate prediction block group in case the first motion vector, the second motion vector, or the third motion vector is not available in the first block A0 or the second block A1 included in the first spatial candidate prediction block group.

According to an embodiment of the present invention, in case there is the first block A0 and the second block A1 included in the first spatial candidate prediction block group are not available or in case the first block A0 and the second block A1 included in the first spatial candidate prediction block group are blocks that have undergone intra prediction, predetermined flag information may be used to mark such information. According to an embodiment of the present invention, in case the first block A0 and the second block A1 included in the first spatial candidate prediction block group are not available or in case the first block A0 and the second block A1 included in the first spatial candidate prediction block group are blocks that have undergone intra prediction, and in case the first motion vector or second motion vector is available in the third block, the fourth block or fifth block in the second spatial candidate prediction block group, the first motion vector or the second motion vector induced from the second spatial candidate prediction block group may be used as the first spatial candidate prediction motion vector.

The availability information of the second spatial candidate prediction motion vector may be produced through the following steps.

(1) Step of determining whether there is the first motion vector in the third block B0, the fourth block B1, or the fifth block B2 included in the second spatial candidate prediction block group, (2) Step of determining whether there is the second motion vector in the third block B0, the fourth block B1, or the fifth block B2 of the second spatial candidate prediction block group in case there is no first motion vector in the third block B0, the fourth block B1, or the fifth block B2 included in the second spatial candidate prediction block group, (3) Step of determining whether there is the third motion vector in the third block B0, the fourth block B1, or the fifth block B2 of the second spatial candidate prediction block group in case the first motion vector or the second motion vector is not available in the third block B0, the fourth block B1, or the fifth block B2 included in the second spatial candidate prediction block group, (4) Step of determining whether there is the fourth motion vector in the third block B0, the fourth block B1, or the fifth block B2 of the second spatial candidate prediction block group in case the first motion vector, the second motion vector, or the third motion vector is not available in the third block B0, the fourth block B1, or the fifth block B2 included in the second spatial candidate prediction block group.

If the conditions disclosed in step S2000 are not satisfied, the temporal candidate prediction motion vector is induced (step S2010).

If the conditions disclosed in step S2000 are satisfied, then two different spatial candidate prediction motion vectors are available. However, if the conditions disclosed in step S2000 are not satisfied, one or less spatial candidate prediction motion vector is available or the same two spatial candidate prediction motion vectors are available. Accordingly, in case the conditions disclosed in step S2000 are not satisfied, the temporal candidate prediction motion vector may be induced.

In case the conditions disclosed in step S2000 are met, the temporal candidate prediction motion vector availability information is set as 0 (step S2020).

In case the conditions disclosed in step S2000 are met, without performing the operation of producing the temporal candidate prediction motion vector, the temporal candidate prediction motion vector availability information, which indicates whether the temporal candidate prediction motion vector is available, is set as 0.

The candidate prediction motion vector list is produced (step S2030).

The candidate prediction motion vector list may be indexed in the following order and may be produced.

1) In case the first spatial candidate prediction motion vector is available, the first spatial candidate prediction motion vector.
2) In case the second spatial candidate prediction motion vector is available, the second spatial candidate prediction motion vector.
3) in case the temporal candidate prediction motion vector is available, the temporal candidate prediction motion vector.

The same spatial candidate prediction motion vector is removed (step S2040).

In case the first spatial candidate prediction motion vector is the same as the second spatial candidate prediction motion vector, the second spatial candidate prediction motion vector may be removed from the candidate prediction motion vector list.

Some spatial candidate prediction motion vectors may be added or removed to/from the candidate prediction motion vector list, thereby adjusting the size of the candidate prediction motion vector list (step S2050).

In case the number of the candidate prediction motion vectors included in the candidate prediction motion vector list is 2 or less, an additional vector, such as a zero vector, may be added to the candidate prediction motion vector list, and in case the number of the candidate prediction motion vectors included in the candidate prediction motion vector list is larger than 2, the candidate prediction motion vectors except for the candidate prediction motion vectors corresponding to index 0 and index 1 may be removed from the candidate prediction motion vector list.

The final prediction motion vector is determined from the candidate prediction motion vector list (step S2060).

One of the candidate prediction motion vectors included in the candidate prediction motion vector list may be used as the final prediction motion vector that is the predicted motion vector of the prediction target block.

The above-described video encoding and video decoding methods may be implemented by each of the components that constitute each of the video encoder and the video decoder, which are described above in connection with FIGS. 1 and 2.

Although the embodiments of the present invention have been described, it may be understood by those skilled in the art that various modifications or alterations may be made to the present invention without departing from the scope and spirit of the present invention claimed in the appending claims.

The invention claimed is:

1. A decoding method, comprising:
configuring a first list comprising a plurality of first candidates using first motion information of a plurality of spatial neighboring blocks and second motion information of a temporal neighboring block of a prediction target block;

updating the first list by adding an additional candidate derived based on a second list to the first list in a case that the number of the plurality of the first candidates in the first list is less than a maximum number of candidates of the first list;

determining third motion information of the prediction target block by selecting one of the plurality of first candidates and the additional candidate in the first list as the third motion information of the prediction target block; and performing inter prediction on the prediction target block using the third motion information of the prediction target block, wherein the second list comprising a plurality of fourth motion information is configured using a plurality of fifth motion information derived before decoding of the prediction target block, and wherein one of the plurality of fourth motion information of the second list is selected as the additional candidate to be added to the first list.

2. The decoding method of claim 1, wherein:
the plurality of spatial neighboring blocks comprise a first spatial neighboring block and a second spatial neighboring block,
whether both of motion information of the first spatial neighboring block and motion information of the second spatial neighboring block are available and whether motion information of the first spatial neighboring block is not equal to motion information of the second spatial neighboring block are determined, and
the second motion information of the temporal neighboring block is not added to the first list in a case that both of motion information of the first spatial neighboring block and motion information of the second spatial neighboring block are available and motion information of the first spatial neighboring block is not equal to motion information of the second spatial neighboring block.

3. The decoding method of claim 1, wherein:
one of the plurality of fourth information at a predefined position in the second list is selected as the additional candidate to be added to the first list.

4. The decoding method of claim 1, wherein:
at least two of the plurality of fourth motion information of the second list are selected as additional candidates to be added to the first list.

5. The decoding method of claim 1, wherein:
the second list is configured for a specific unit comprising a plurality of blocks in a picture, and
the plurality of fifth motion information are derived for the plurality of blocks in the specific unit.

6. The decoding method of claim 1, wherein none of the plurality of first candidates is deleted from the first list.

7. An encoding method, comprising:
configuring a first list comprising a plurality of first candidates using first motion information of a plurality of spatial neighboring blocks and second motion information of a temporal neighboring block of a prediction target block;
updating the first list by adding an additional candidate derived based on a second list to the first list in a case that the number of the plurality of the first candidates in the first list is less than a maximum number of candidates of the first list;

determining third motion information of the prediction target block by selecting one of the plurality of first candidates and the additional candidate in the first list as the third motion information of the prediction target block; and performing inter prediction on the prediction target block using the third motion information of the prediction target block, wherein the second list comprising a plurality of fourth motion information is configured using a plurality of fifth motion information derived before encoding of the prediction target block, and wherein one of the plurality of fourth motion information of the second list is selected as the additional candidate to be added to the first list.

8. The encoding method of claim 7, wherein:
the plurality of spatial neighboring blocks are three neighboring blocks, and
the first motion information of the prediction target block is determined using a calculation using motion information of the three neighboring blocks.

9. A non-transitory computer-readable medium for recording a bitstream generated by the encoding method according to claim 8.

10. The encoding method of claim 7, wherein:
one of the plurality of fourth information at a predefined position in the second list is selected as the additional candidate to be added to the first list.

11. The encoding method of claim 7, wherein:
at least two of the plurality of fourth motion information of the second list are selected as additional candidates to be added to the first list.

12. The encoding method of claim 7, wherein:
the second list is configured for a specific unit comprising a plurality of blocks in a picture, and
the plurality of fifth motion information are derived for the plurality of blocks in the specific unit.

13. A non-transitory computer-readable recording medium storing a bitstream, the bitstream comprising:
index information indicating a selected candidate in a first list, wherein
the first list comprising a plurality of first candidates is configured using first motion information of a plurality of spatial neighboring blocks and second motion information of a temporal neighboring block of a prediction target block,
the first list is updated by adding an additional candidate derived based on a second list to the first list in a case that the number of the plurality of the first candidates in the first list is less than a maximum number of candidates of the first list,
third motion information of the prediction target block is determined by selecting one of the plurality of first candidates and the additional candidate in the first list as the third motion information of the prediction target block using the index information,
inter prediction on the prediction target block is performed using the third motion information of the prediction target block,
the second list comprising a plurality of fourth motion information is configured using a plurality of fifth motion information derived before decoding of the prediction target block, and
wherein one of the plurality of fourth motion information of the second list is selected as the additional candidate to be added to the first list.

14. The non-transitory computer-readable recording medium storing the bitstream of claim 13, wherein:
one of the plurality of fourth information at a predefined position in the second list is selected as the additional candidate to be added to the first list.

15. The non-transitory computer-readable recording medium storing the bitstream of claim 13, wherein:
at least two of the plurality of fourth motion information of the second list are selected as additional candidates to be added to the first list.

16. The non-transitory computer-readable recording medium storing the bitstream of claim 13, wherein:
the second list is configured for a specific unit comprising a plurality of blocks in a picture, and
the plurality of fifth motion information are derived for the plurality of blocks in the specific unit.

17. A non-transitory computer-readable recording medium storing a bitstream including a computer-executable code, the computer-executable code, when executed by a processor of a video decoding apparatus, causing the processor to perform the following steps:
configuring a first list comprising a plurality of first candidates using first motion information of a plurality of spatial neighboring blocks and second motion information of a temporal neighboring block of a prediction target block;
updating the first list by adding an additional candidate derived based on a second list to the first list in a case that the number of the plurality of first candidates in the first list is less than a maximum number of candidates of the first list;
determining third motion information of the prediction target block by selecting one of the plurality of first candidates and the additional candidate in the first list as the third motion information of the prediction target block using index information of the computer-executable code; and
performing inter prediction on the prediction target block using the third motion information of the prediction target block,
wherein the second list comprising a plurality of fourth motion information is configured using a plurality of fifth motion information derived before decoding of the prediction target block, and
wherein one of the plurality of fourth motion information of the second list is selected as the additional candidate to be added to the first list.

18. The non-transitory computer-readable recording medium storing the bitstream of claim 17, wherein:
one of the plurality of fourth information at a predefined position in the second list is selected as the additional candidate to be added to the first list.

19. The non-transitory computer-readable recording medium storing the bitstream of claim 17, wherein:
at least two of the plurality of fourth motion information of the second list are selected as additional candidates to be added to the first list.

20. The non-transitory computer-readable recording medium storing the bitstream of claim 17, wherein:
the second list is configured for a specific unit comprising a plurality of blocks in a picture, and
the plurality of fifth motion information are derived for the plurality of blocks in the specific unit.

* * * * *